(12) United States Patent
Zhao et al.

(10) Patent No.: US 9,894,565 B2
(45) Date of Patent: Feb. 13, 2018

(54) COMMUNICATION CONNECTION ESTABLISHMENT METHOD AND MEDIATION DEVICE

(71) Applicant: Huawei Device (Dongguan) Co., Ltd., Dongguan (CN)

(72) Inventors: Xiaona Zhao, Beijing (CN); Xinmiao Chang, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 15/115,055

(22) PCT Filed: Jan. 29, 2014

(86) PCT No.: PCT/CN2014/071777
§ 371 (c)(1),
(2) Date: Jul. 28, 2016

(87) PCT Pub. No.: WO2015/113260
PCT Pub. Date: Aug. 6, 2015

(65) Prior Publication Data
US 2016/0345211 A1 Nov. 24, 2016

(51) Int. Cl.
*H04W 36/00* (2009.01)
*H04W 76/02* (2009.01)
(Continued)

(52) U.S. Cl.
CPC ...... *H04W 36/0027* (2013.01); *H04B 5/0031* (2013.01); *H04B 5/02* (2013.01);
(Continued)

(58) Field of Classification Search
CPC . H04W 35/0027; H04W 4/008; H04W 36/00; H04W 36/14; H04W 76/02;
(Continued)

(56) References Cited

U.S. PATENT DOCUMENTS 6,751,200 B1 * 6/2004 Larsson .................. H04L 45/02
370/255
7,801,486 B2 9/2010 Barnier
(Continued)

FOREIGN PATENT DOCUMENTS

CN 1802835 A 7/2006
CN 101080906 A 11/2007
(Continued)

*Primary Examiner* — Edward Urban
*Assistant Examiner* — Ralph H Justus
(74) *Attorney, Agent, or Firm* — Leydig, Voit & Mayer, Ltd.

(57) ABSTRACT

The present disclosure relates to a communication connection establishment method and a mediation device. The method includes: performing, by a mediation device, a first communication connection to at least three candidate devices, to acquire connection configuration information of the candidate devices, and saving the acquired connection configuration information; before or after or when the mediation device performs the first communication connection to the at least three candidate devices, determining, by the mediation device, that one of the candidate devices is a main device and the other candidate devices are target devices; and matching, by the mediation device, connection configuration information of the main device with connection configuration information of each of the target devices, so that the main device establishes a second communication connection to each of the target devices.

12 Claims, 14 Drawing Sheets

(51) Int. Cl.
*H04W 36/14* (2009.01)
*H04W 4/00* (2009.01)
*H04B 5/02* (2006.01)
*H04B 5/00* (2006.01)
*H04W 84/20* (2009.01)

(52) U.S. Cl.
CPC ........... *H04W 4/008* (2013.01); *H04W 36/00* (2013.01); *H04W 36/14* (2013.01); *H04W 76/02* (2013.01); *H04W 76/025* (2013.01); *H04W 84/20* (2013.01)

(58) Field of Classification Search
CPC .. H04W 76/025; H04W 84/20; H04B 5/0031; H04B 5/02; H04L 67/2819; H04L 64/303; H04L 67/34; H04L 69/14; H04L 29/24; H04L 29/18
USPC .............................................. 455/41.1, 41.2
See application file for complete search history.

(56) References Cited

U.S. PATENT DOCUMENTS

| | | | |
|---|---|---|---|
| 7,970,350 | B2 | 6/2011 | Sheynman et al. |
| 8,180,278 | B2 | 5/2012 | Soma et al. |
| 8,224,246 | B2 | 7/2012 | Suumäki et al. |
| 8,462,734 | B2 | 6/2013 | Laine et al. |
| 8,942,626 | B2 | 1/2015 | Cho et al. |
| 8,996,731 | B2 | 3/2015 | Takayama et al. |
| 2007/0107020 | A1 | 5/2007 | Tavares |
| 2009/0077187 | A1* | 3/2009 | Azuma ................. H04W 48/18 709/206 |
| 2010/0329193 | A1* | 12/2010 | Bienas ................ H04W 74/006 370/329 |
| 2012/0100803 | A1 | 4/2012 | Suumäki et al. |
| 2012/0302170 | A1* | 11/2012 | Frazier ................. H04W 84/20 455/41.3 |
| 2012/0309309 | A1 | 12/2012 | Cho et al. |
| 2013/0005246 | A1* | 1/2013 | Waters ...................... H04B 5/02 455/41.1 |
| 2014/0148098 | A1* | 5/2014 | Song ................... H04W 76/023 455/41.1 |
| 2014/0293809 | A1* | 10/2014 | Kim .................... H04W 76/023 370/252 |
| 2014/0307727 | A1* | 10/2014 | Cha ....................... H04W 56/00 370/350 |
| 2015/0133048 | A1* | 5/2015 | Shimoji .................. H04L 67/34 455/41.1 |

FOREIGN PATENT DOCUMENTS

| | | |
|---|---|---|
| CN | 101843124 A | 9/2010 |
| CN | 102457849 A | 5/2012 |
| CN | 102771064 A | 11/2012 |
| CN | 102781116 A | 11/2012 |
| EP | 2739116 A2 | 6/2014 |
| JP | 2007135207 A | 5/2007 |
| KR | 20140054075 A | 5/2014 |
| WO | WO 2013015571 A2 | 1/2013 |
| WO | WO 2013184128 A1 | 12/2013 |

\* cited by examiner

S101. A mediation device M receives a role indication command, to determine that the mediation device M serves as a handover mediator that assists, based on NFC, a main device A to establish communication connections to multiple target devices B

↓

S102. The mediation device M empties a connection configuration information list in the mediation device M, which is equivalent to initializing the connection configuration information list CARRIER_CONFIG_LIST

↓

S301. The mediation device M selects a many-to-one mode, to determine to first tap the target devices and then tap the main device

↓

S103. The mediation device M taps a target device B, to send a handover request to the target device B, and then receives a handover mediation response fed back by the target device B, thereby acquiring connection configuration information of the target device B

↓

S104. The mediation device M saves the acquired connection configuration information in the connection configuration information list

↓

S105. Whether the mediation device M receives an acquisition completion command? —No—┐ (loops back to S103)

↓ Yes

The mediation device M outputs a prompt indicating that collection of connection configuration information of all the devices is completed

↓

S107. The mediation device M taps the main device A, to send a handover request to the main device A, and then receives a handover mediation response fed back by the main device A, thereby acquiring connection configuration information of the main device A

↓

S108. The mediation device M performs matching processing between connection configuration information saved in the connection configuration information list and the connection configuration information of the main device A, to obtain matching connection configuration information

↓

S109. The mediation device M sends a handover initiate request to the main device A, and then receives a handover initiate response fed back by the main device A, where the handover initiate response includes connection configuration information selected by the main device A for each target device B

↓

S110. The main device A initiates a communication connection between the main device A and each target device B based on the connection configuration information selected by the main device A for each target device B

↓

End

FIG. 5

CONT. FROM
FIG. 7A

M outputs a prompt indicating that collection of connection configuration information of all the target devices is completed S107. The mediation device M taps the main device A, to send a handover request to the main device A, and then receives a handover mediation response fed back by the main device A, thereby acquiring connection configuration information of the main device A S108. The mediation device M performs matching processing between connection configuration information saved in the connection configuration information list and the connection configuration information of the main device A, to obtain matching connection configuration information S109. The mediation device M sends a handover initiate request to the main device A, and then receives a handover initiate response fed back by the main device A, where the handover initiate response includes connection configuration information selected by the main device A for each target device B S110. The main device A initiates a communication connection between the main device A and each target device B based on the connection configuration information selected by the main device A for each target device B End

FIG. 7B

S101. A mediation device M receives a role indication command, to determine that the mediation device M serves as a handover mediator that assists, based on NFC, a main device A to establish communication connections to multiple target devices B S701. The mediation device M selects a one-to-many mode, to determine to first tap the main device and then tap the target devices S702. The mediation device M taps the main device A, sends a handover request to the main device A, and receives a handover mediation response fed back by the main device A, where the handover mediation response includes connection configuration information of the main device A, thereby acquiring the connection configuration information of the main device A S703. The mediation device M taps a target device B, sends a handover request to the target device B, and receives a handover mediation response fed back by the target device B, thereby acquiring connection configuration information of the target device B S704. The mediation device M performs matching processing between the connection configuration information of the target device B and the connection configuration information of the main device A, to determine connection configuration information that is of the main device A and matches the connection configuration information of the target device B S705. The mediation device M sends a handover initiate request to the target device B, and then receives a handover initiate response fed back by the target device B, where the handover initiate response includes connection configuration information selected by the target device B for the main device A S706. The target device B initiates a communication connection between the target device B and the main device A based on the connection configuration information selected by the target device B for the main device A S707. The mediation device M saves the connection configuration information of the main device A, and releases the connection configuration information of the target device B S708. The mediation device M determines whether an establishment completion command is received? —No—

Yes

End

FIG. 9

```
┌─────────────────────────────────────────────────────────────────────────┐
│ S101. A mediation device M receives a role indication command, to determine that the │
│ mediation device M serves as a handover mediator that assists, based on NFC, a main device │
│ A to establish communication connections to multiple target devices B │
└─────────────────────────────────────────────────────────────────────────┘
                                      ↓
┌─────────────────────────────────────────────────────────────────────────┐
│ S701. The mediation device M selects a one-to-many mode, to determine to first tap the main │
│                    device and then tap the target devices │
└─────────────────────────────────────────────────────────────────────────┘
                                      ↓
┌─────────────────────────────────────────────────────────────────────────┐
│ S702. The mediation device M taps the main device A, sends a handover request to the main │
│ device A, and receives a handover mediation response fed back by the main device A, where │
│ the handover mediation response includes connection configuration information of the main │
│ device A, thereby acquiring the connection configuration information of the main device A │
└─────────────────────────────────────────────────────────────────────────┘
                                      ↓
┌─────────────────────────────────────────────────────────────────────────┐
│ S801. The mediation device M receives a quantity indication command, to determine a │
│                    quantity N of the target devices B │
└─────────────────────────────────────────────────────────────────────────┘
                                      ↓
┌─────────────────────────────────────────────────────────────────────────┐
│           S802. The mediation device M sets a count value of a counter to 0 │
└─────────────────────────────────────────────────────────────────────────┘
                                      ↓
┌─────────────────────────────────────────────────────────────────────────┐
│ S703. The mediation device M taps a target device B, sends a handover request to the target │
│ device B, and receives a handover mediation response fed back by the target device B, thereby │◄─┐
│                acquiring connection configuration information of the target device B │  │
└─────────────────────────────────────────────────────────────────────────┘  │
                                      ↓                                       │
┌─────────────────────────────────────────────────────────────────────────┐  │
│       S704 The mediation device M performs matching processing between the connection │  │
│ configuration information of the target device B and the connection configuration information │  │
│    of the main device A, to determine connection configuration information that is of the main │  │
│            device A and matches the connection configuration information of the target device B │  │
└─────────────────────────────────────────────────────────────────────────┘  │
                                      ↓                                       │
┌─────────────────────────────────────────────────────────────────────────┐  │
│ S705. The mediation device M sends a handover initiate request to the target device B, and │  │
│ then receives a handover initiate response fed back by the target device B, where the handover │  │
│ initiate response includes connection configuration information selected by the target device B │  │
│                              for the main device A │  │
└─────────────────────────────────────────────────────────────────────────┘  │
                                      ↓                                       │
┌─────────────────────────────────────────────────────────────────────────┐  │
│ S706. The target device B initiates a communication connection between the target device B │  │
│ and the main device A based on the connection configuration information selected by the │  │
│                    target device B for the main device A │  │
└─────────────────────────────────────────────────────────────────────────┘  │
                                      ↓                                       │
┌─────────────────────────────────────────────────────────────────────────┐  │
│ S707. The mediation device M saves the connection configuration information of the main │  │
│    device A, and releases the connection configuration information of the target device B │  │
└─────────────────────────────────────────────────────────────────────────┘  │
                                      ↓                                       │
┌─────────────────────────────────────────────────────────────────────────┐  │
│              S803. The mediation device M adds 1 to the count value of the counter │  │
└─────────────────────────────────────────────────────────────────────────┘  │
                                      ↓                                       │
                          ╱ S804. The mediation device M ╲                    │
                      ◄──╱   determines whether the count value of  ╲── Yes ──┘
                          ╲      the counter is less than N?    ╱
                                      │
                                      No
                                      ↓
                                   ( End )
```

FIG. 10

COMMUNICATION CONNECTION ESTABLISHMENT METHOD AND MEDIATION DEVICE

CROSS-REFERENCE TO RELATED APPLICATIONS

This application is a U.S. National Phase of International Application No. PCT/CN2014/071777, filed Jan. 29, 2014, the entire contents of which is incorporated by reference herein.

TECHNICAL FIELD

The present disclosure relates to the communications field, and in particular, to a communication connection establishment method and apparatus.

BACKGROUND

Near Field Communication (NFC) is a short-range communication connection technology based on a radio frequency identification (RFID) technology. A user can implement short-range communication, such as visual, secure, and contactless information exchange and transaction payment, between two terminal devices simply by using one terminal device to tap or approach another terminal device. At present, NFC mainly works at a frequency of 13.56 MHz and can support four transmission rates: 106 kbit/s, 212 kbit/s, 424 kbit/s, and 848 kbit/s, and an effective communication range is approximately 0 cm to 20 cm, where a typical value is 4 cm.

Due to a low data transmission rate, NFC is suitable for exchange of a small amount of data. In other words, if NFC is used for transmission of a large file, a problem that user experience is affected by a low transmission speed appears. Therefore, an NFC forum proposes a connection handover technology based on NFC.

The so-called connection handover technology based on NFC refers to: two terminals that support both NFC and another communication connection can exchange, by using NFC, connection configuration information of another communication connection manner in a peer-to-peer (P2P) mode, so that another communication connection can be established between the two terminals. The another communication connection manner includes Bluetooth (BT), Wireless Fidelity (Wi-Fi), and the like.

However, in a case in which devices have relatively large sizes and relatively fixed positions, it may not be convenient for two terminals that support both NFC and another communication connection to directly tap or approach each other. Therefore, in the Connection Handover Technical Specification Version 1.3 ("CH 1.3 Specification"), the NFC forum proposes that a mobile terminal (for example, a mobile phone) supporting NFC may be used as a handover mediator to assist two terminals to establish another communication connection.

Specifically, assuming that a handover mediator is intended to assist in establishing a Bluetooth connection between a first terminal and a second terminal, according to the CH 1.3 Specification, the handover mediator needs to: first tap or approach the first terminal and the second terminal separately, to separately acquire Bluetooth connection configuration information of the first terminal and the second terminal; and then send the Bluetooth connection configuration information of the first terminal to the second terminal, so that the second terminal can initiate a Bluetooth connection initiate request to the first terminal based on the received Bluetooth connection configuration information.

According to the prior art, in a case in which a handover mediator M is used to assist, based on NFC, a device A to establish communication connections to N (N≥2) devices B, the handover mediator M needs to move back and forth between the device A and the N devices B at least N times: specifically, the handover mediator M taps or approaches the device A once, and the handover mediator M taps or approaches a first device $B_1$ once; the handover mediator M taps or approaches the device A once, and the handover mediator M taps or approaches a second device $B_2$ once; . . . the handover mediator M taps or approaches the device A once, and the handover mediator M taps or approaches a $N^{th}$ device $B_N$ once. These operations obviously take a lot of time and effort, especially in a case in which the main device A and a target device B are far from each other.

Besides, according to the CH 1.3 Specification, any terminal can ensure that all carriers in the message carrier list remain in a connectable state for a period of time (for example, 2 minutes) after sending a handover mediation response, which is very likely to cause a misconnection between multiple devices that are successively tapped by the handover mediator M within the 2 minutes. For example, in the 2-minute connectable state, the handover mediator M taps or approaches the device A once, taps or approaches the first device $B_1$ once, taps or approaches the second device $B_2$ once, and taps or approaches the device A once; in this case, a misconnection between the first device $B_1$ and the second device $B_2$ may be caused.

SUMMARY

In view of this, a technical problem to be resolved by the present disclosure is how to use a handover mediator to assist, with less time and effort and based on a first communication connection, a main device to establish second communication connections with multiple target devices and effectively avoid a misconnection between the devices.

According to a first aspect, a communication connection establishment method is provided, including: performing, by a mediation device, a first communication connection to at least three candidate devices, to acquire connection configuration information of the candidate devices, and saving the acquired connection configuration information; before or after or when the mediation device performs the first communication connection to the at least three candidate devices, determining, by the mediation device, that one of the candidate devices is a main device and the other candidate devices are target devices; and matching, by the mediation device, connection configuration information of the main device with connection configuration information of each of the target devices, so that the main device establishes a second communication connection to each of the target devices.

In a possible implementation manner, the determining, by the mediation device, that one of the candidate devices is a main device specifically includes: determining, by the mediation device, that the first candidate device that performs the first communication connection to the mediation device is the main device; the performing, by a mediation device, a first communication connection to at least three candidate devices, to acquire connection configuration information of the candidate devices, and saving the acquired connection configuration information specifically includes: first performing, by the mediation device, the first communication connection to the main device, then performing the first communication connection to each of the target devices, to separately acquire the connection configuration information of the main device and the target devices, and saving the acquired connection configuration information; and the matching, by the mediation device, connection configuration information of the main device with connection configuration information of each of the target devices, so that the main device establishes a second communication connection to each of the target devices specifically includes: each time after performing the first communication connection to one of the target devices and before performing the first communication connection to next one of the target devices, matching, by the mediation device, the connection configuration information of the main device with connection configuration information of a target device that currently performs the first communication connection, to obtain matching connection configuration information, and sending, by the mediation device, a handover initiate request to the target device that currently performs the first communication connection, where the handover initiate request includes the matching connection configuration information, so that the target device that currently performs the first communication connection initiates the second communication connection to the main device.

In a possible implementation manner, the determining, by the mediation device, that one of the candidate devices is a main device specifically includes: determining, by the mediation device, that the last candidate device that performs the first communication connection to the mediation device is the main device; and the performing, by a mediation device, a first communication connection to at least three candidate devices, to acquire connection configuration information of the candidate devices, and saving the acquired connection configuration information specifically includes: first performing, by the mediation device, the first communication connection to the target devices separately, finally performing the first communication connection to the main device, to separately acquire the connection configuration information of the target devices and the main device, and saving the acquired connection configuration information.

In a possible implementation manner, the determining, by the mediation device, that one of the candidate devices is a main device specifically includes: determining, by the mediation device according to a device selection command, that one of the candidate devices is the main device; or determining, by the mediation device, that the first device that performs the first communication connection to the mediation device after the mediation device performs the first communication connection to the at least three candidate devices is the main device.

In a possible implementation manner, the matching, by the mediation device, connection configuration information of the main device with connection configuration information of each of the target devices, so that the main device establishes a second communication connection to each of the target devices specifically includes: matching, by the mediation device, the connection configuration information of the main device with the connection configuration information of each of the target devices, to obtain matching connection configuration information; sending, by the mediation device, one handover initiate request to the main device, where the handover initiate request includes all the matching connection configuration information; and receiving, by the mediation device, one handover initiate response sent by the main device, where the handover initiate response includes connection configuration information selected by the main device for each of the target devices, so that the main device initiates the second communication connection to each of the target devices.

In a possible implementation manner, the matching, by the mediation device, connection configuration information of the main device with connection configuration information of each of the target devices, so that the main device establishes a second communication connection to each of the target devices specifically includes: sequentially matching, by the mediation device, the connection configuration information of the main device with the connection configuration information of each of the target devices, to obtain matching connection configuration information, and sending at least two handover initiate requests to the main device, where each of the handover initiate requests includes at least one piece of the matching connection configuration information; and receiving, by the mediation device, at least two handover initiate responses sent by the main device, where each of the handover initiate responses includes connection configuration information selected by the main device for at least one of the target devices, so that the main device initiates the second communication connection to each of the target devices.

In a possible implementation manner, the first communication connection includes Near Field Communication NFC, and the second communication connection includes a Bluetooth connection and/or a Wireless Fidelity Wi-Fi connection.

According to a second aspect, a mediation device is provided, including: an acquiring module, configured to perform a first communication connection to at least three candidate devices, to acquire connection configuration information of the candidate devices, and save the acquired connection configuration information; a determining module, connected to the acquiring module, configured to: before or after or when the first communication connection is performed with the at least three candidate devices, determine that one of the candidate devices is a main device and the other candidate devices are target devices; and an establishment module, connected to the determining module, configured to match connection configuration information of the main device with connection configuration information of each of the target devices, so that the main device establishes a second communication connection to each of the target devices.

In a possible implementation manner, the determining module is configured to: determine that the first candidate device that performs the first communication connection to the mediation device is the main device; the acquiring module is configured to: first perform the first communication connection to the main device, then perform the first communication connection to each of the target devices, to separately acquire the connection configuration information of the main device and the target devices, and save the acquired connection configuration information; and the establishment module is configured to: each time after the first communication connection is performed with one of the target devices and before the first communication connection is performed with next one of the target devices, match the connection configuration information of the main device with connection configuration information of a target device that currently performs the first communication connection, to obtain matching connection configuration information; and send a handover initiate request to the target device that currently performs the first communication connection, where the handover initiate request includes the matching connection configuration information, so that the target device that currently performs the first communication connection initiates the second communication connection to the main device.

In a possible implementation manner, the determining module is configured to: determine that the last candidate device that performs the first communication connection to the mediation device is the main device; and the acquiring module is configured for the mediation device to: first perform the first communication connection to the target devices separately, finally perform the first communication connection to the main device, to separately acquire the connection configuration information of the target devices and the main device, and save the acquired connection configuration information.

In a possible implementation manner, the determining module is configured to: determine, according to a device selection command, that one of the candidate devices is the main device; or determine that the first device that performs the first communication connection to the mediation device after the first communication connection is performed with the at least three candidate devices is the main device.

In a possible implementation manner, the establishment module is configured to: match the connection configuration information of the main device with the connection configuration information of each of the target devices, to obtain matching connection configuration information; send one handover initiate request to the main device, where the handover initiate request includes all the matching connection configuration information; and receive one handover initiate response sent by the main device, where the handover initiate response includes connection configuration information selected by the main device for each of the target devices, so that the main device initiates the second communication connection to each of the target devices.

In a possible implementation manner, the establishment module is configured to: sequentially match the connection configuration information of the main device with the connection configuration information of each of the target devices, to obtain matching connection configuration information, and send at least two handover initiate requests to the main device, where each of the handover initiate requests includes at least one piece of the matching connection configuration information; and receive at least two handover initiate responses sent by the main device, where each of the handover initiate responses includes connection configuration information selected by the main device for at least one of the target devices, so that the main device initiates the second communication connection to each of the target devices.

In a possible implementation manner, the first communication connection includes Near Field Communication NFC, and the second communication connection includes a Bluetooth connection and/or a Wireless Fidelity Wi-Fi connection.

According to a third aspect, a mediation device is provided, including: a communications interface, configured to perform a first communication connection to at least three candidate devices, to acquire connection configuration information of the candidate devices; a memory, configured to save the connection configuration information acquired by using the communications interface; and a processor, connected to the communications interface and the memory, configured to: before or after or when the communications interface performs the first communication connection to the at least three candidate devices, determine that one of the candidate devices is a main device and the other candidate devices are target devices, and match connection configuration information of the main device with connection configuration information of each of the target devices, so that the main device establishes a second communication connection to each of the target devices.

In a possible implementation manner, the processor is configured to: determine that the first candidate device that performs the first communication connection to the mediation device is the main device; and each time after the communications interface performs the first communication connection to one of the target devices and before the communications interface performs the first communication connection to next one of the target devices, match, by the processor, the connection configuration information of the main device with connection configuration information of a target device that currently performs the first communication connection, to obtain matching connection configuration information, and send, via the communications interface, a handover initiate request to the target device that currently performs the first communication connection, where the handover initiate request includes the matching connection configuration information, so that the target device that currently performs the first communication connection initiates the second communication connection to the main device.

In a possible implementation manner, the processor is configured to: determine that the last candidate device that performs the first communication connection to the mediation device is the main device.

In a possible implementation manner, the processor is configured to: determine, according to a device selection command, that one of the candidate devices is the main device; or determine that the first device that performs the first communication connection to the mediation device after the communications interface performs the first communication connection to the at least three candidate devices is the main device.

In a possible implementation manner, the processor is configured to: match the connection configuration information of the main device with the connection configuration information of each of the target devices, to obtain matching connection configuration information; send one handover initiate request to the main device via the communications interface, where the handover initiate request includes all the matching connection configuration information; and receive, via the communications interface, one handover initiate response sent by the main device, where the handover initiate response includes connection configuration information selected by the main device for each of the target devices, so that the main device initiates the second communication connection to each of the target devices.

In a possible implementation manner, the processor is configured to: sequentially match the connection configuration information of the main device with the connection configuration information of each of the target devices, to obtain matching connection configuration information; send at least two handover initiate requests to the main device via the communications interface, where each of the handover initiate requests includes at least one piece of the matching connection configuration information; and receive, via the communications interface, at least two handover initiate responses sent by the main device, where each of the handover initiate responses includes connection configuration information selected by the main device for at least one of the target devices, so that the main device initiates the second communication connection to each of the target devices.

In a possible implementation manner, the first communication connection includes Near Field Communication NFC, and the second communication connection includes a Bluetooth connection and/or a Wireless Fidelity Wi-Fi connection.

Beneficial effects are as follows:

A mediation device acquires and saves connection configuration information of candidate devices, determines that one of the candidate devices is a main device and the other candidate devices are target devices, and matches connection configuration information of the main device with connection configuration information of each target device, so that the main device establishes a second communication connection to each target device. According to the communication connection establishment method and the mediation device that are provided in the embodiments of the present disclosure, a mediation device can be used to assist, with less time and effort and based on a first communication connection, a main device to separately establish second communication connections to multiple target devices, and a misconnection between the target devices can be effectively avoided.

The following describes exemplary embodiments in detail with reference to accompanying drawings, and other features and aspects of the aspect are made clear.

BRIEF DESCRIPTION OF DRAWINGS

Accompanying drawings included in the specification and constructing a part of the specification jointly show the exemplary embodiments, characteristics and aspects of the present disclosure, and are intended to explain the principles of the present disclosure.

FIG. 5 is a flowchart of a communication connection establishment method according to Embodiment 4 of the present disclosure;

FIG. 7A and FIG. 7B are a flowchart of a communication connection establishment method according to Embodiment 6 of the present disclosure;

FIG. 9 is a flowchart of a communication connection establishment method according to Embodiment 8 of the present disclosure;

FIG. 10 is a flowchart of a communication connection establishment method according to Embodiment 9 of the present disclosure;

DESCRIPTION OF EMBODIMENTS

The following describes various exemplary embodiments, features and aspects of the present disclosure in detail with reference to the accompanying drawings. Like accompanying symbols in the accompanying drawings represent elements with like or similar functions. Although various aspects of the embodiments are illustrated in the accompanying drawing, the accompanying drawings are not necessarily drawn in proportion unless otherwise specified.

The specific term "exemplary" herein means "used as an example, embodiment or illustrative". Any embodiment described as "exemplary" is not necessarily explained as being superior or better than other embodiments.

In addition, for better illustration of the present disclosure, various specific details are given in the following specific implementation manner. A person of ordinary skill in the art should understand that the present disclosure may also be implemented without the specific details. In some other embodiments, methods, means, components, and circuits well known by a person skilled in the art are not described in detail, so that a main purpose of the present disclosure is highlighted.

Embodiment 1

Figure 1:
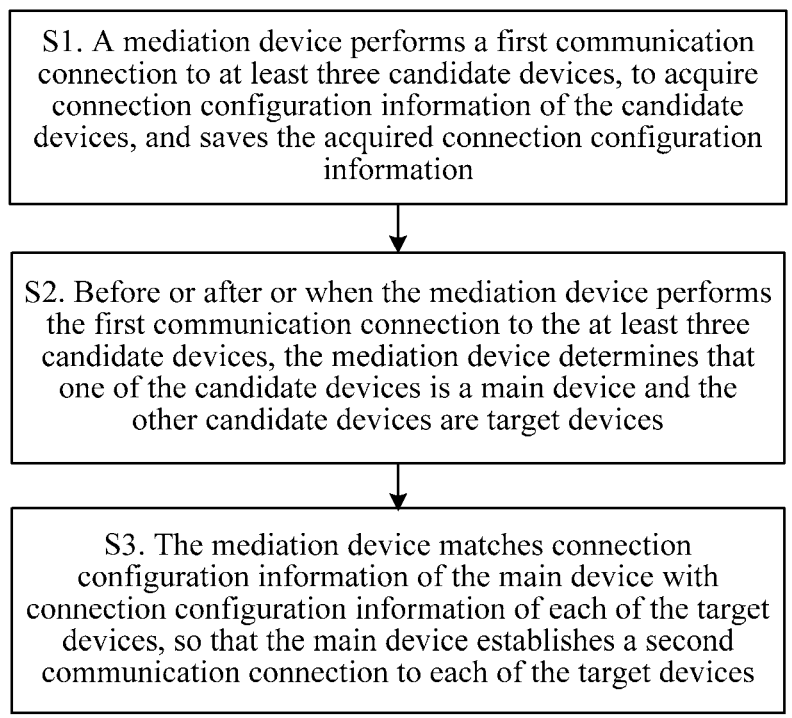
FIG. 1 is a flowchart of a communication connection establishment method according to Embodiment 1 of the present disclosure.

FIG. 1 is a flowchart of a communication connection establishment method according to Embodiment 1 of the present disclosure. As shown in FIG. 1, the method mainly includes:

Step S1: A mediation device performs a first communication connection to at least three candidate devices, to acquire connection configuration information of the candidate devices, and saves the acquired connection configuration information.

Step S2: Before or after or when the mediation device performs the first communication connection to the at least three candidate devices, the mediation device determines that one of the candidate devices is a main device and the other candidate devices are target devices. A determining manner may include:

Manner 1: The mediation device determines that the first candidate device that performs the first communication connection to the mediation device is the main device.

Manner 2: The mediation device determines that the last candidate device that performs the first communication connection to the mediation device is the main device.

Manner 3: The mediation device determines, according to a device selection command, that one of the candidate devices is the main device.

Manner 4: The mediation device determines that the first device that performs the first communication connection to the mediation device after the mediation device performs the first communication connection to the at least three candidate devices is the main device.

Step S3: The mediation device matches connection configuration information of the main device with connection configuration information of each of the target devices, so that the main device establishes a second communication connection to each of the target devices. The first communication connection includes Near Field Communication NFC, and the second communication connection includes a Bluetooth connection and/or a Wireless Fidelity Wi-Fi connection.

A mediation device acquires and saves connection configuration information of candidate devices, determines that one of the candidate devices is a main device and the other candidate devices are target devices, and matches connection configuration information of the main device with connection configuration information of each target device, so that the main device establishes a second communication connection to each target device. According to the communication connection establishment method provided in this embodiment of the present disclosure, a mediation device can be used to assist, with less time and effort and based on a first communication connection, a main device to separately establish second communication connections to multiple target devices, and a misconnection between the target devices can be effectively avoided.

Embodiment 2

Figure 2:
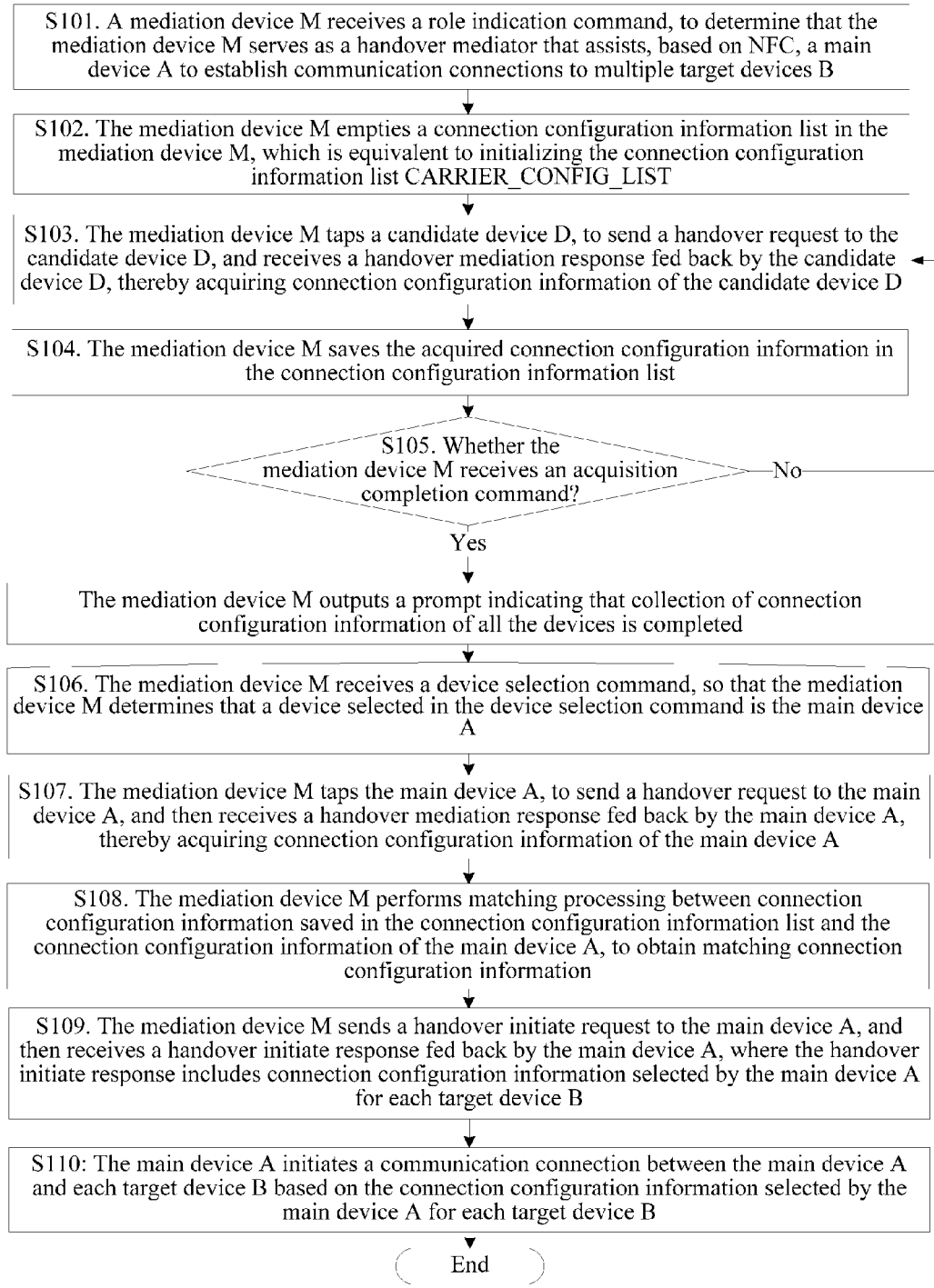
FIG. 2 is a flowchart of a communication connection establishment method according to Embodiment 2 of the present disclosure.

FIG. 2 is a flowchart of a communication connection establishment method according to Embodiment 2 of the present disclosure. As shown in FIG. 2, the method mainly includes:

Step S101: A mediation device M receives a role indication command, to determine that the mediation device M serves as a handover mediator that assists, based on NFC, a main device A to establish communication connections to multiple target devices B.

Step S102: The mediation device M empties a connection configuration information list in the mediation device M, which is equivalent to initializing the connection configuration information list CARRIER_CONFIG_LIST. A sequence between steps S101 and S102 is not limited. That is, S102 may be performed before S101, or the two steps may be combined into one step when performed.

Step S103: The mediation device M taps a candidate device D, to send a handover request to the candidate device D, where the handover request may include a handover mediation record ("Hm" record), where "Hm" represents a special carrier type, used to identify the terminal M as a mediation device; and then receives a handover mediation response fed back by the candidate device D, where the handover mediation response may include connection configuration information of the candidate device D, so as to acquire the connection configuration information of the candidate device D.

Step S104: The mediation device M saves the acquired connection configuration information in the connection configuration information list.

Step S105: The mediation device M determines whether an acquisition completion command is received; and if no acquisition completion command is received, returns to step S103; or if an acquisition completion command is received, determines that collection of candidate connection configuration information is completed, and continues to perform step S106. Besides, in a possible implementation manner, after receiving an acquisition completion command, that is, in a case in which it is determined in step S105 that an acquisition completion command is received, the mediation device M may further prompt a user that collection of connection configuration information of all the candidate devices is completed, to remind the user to select the main device A, that is, perform step S106.

Step S106: The mediation device M receives a device selection command, so that the mediation device M determines that a device selected in the device selection command is the main device A.

Step S107: The mediation device M taps the main device A, to send a handover request to the main device A, and then receives a handover mediation response fed back by the main device A, so as to acquire connection configuration information of the main device A. In a possible implementation manner, this step may further include: if the connection configuration information of the main device A is already recorded in the connection configuration information list, that is, the main device A is previously tapped as a candidate device D by the mediation device M, in response to the received device selection command, the mediation device M may ignore the connection configuration information of the main device A in the connection configuration information list, for example, delete the connection configuration information of the main device A or mark the connection configuration information of the main device A as unusable.

Step S108: The mediation device M performs matching processing between connection configuration information saved in the connection configuration information list and the connection configuration information of the main device A, to obtain matching connection configuration information.

Step S109: The mediation device M sends a handover initiate request to the main device A, where the handover initiate request includes connection configuration information of all the target devices B that matches the connection configuration information of the main device A; and then receives a handover initiate response fed back by the main device A, where the handover initiate response includes connection configuration information selected by the main device A for each target device B.

Step S110: The main device A initiates a communication connection, which includes but is not limited to a Bluetooth connection and a Wi-Fi connection, between the main device A and each target device B based on the connection configuration information selected by the main device A for each target device B.

A mediation device acquires and saves connection configuration information of candidate devices, determines that one of the candidate devices is a main device and the other candidate devices are target devices, and matches connection configuration information of the main device with connection configuration information of each target device, so that the main device establishes a second communication connection to each target device. The communication connection establishment method according to this embodiment obviously reduces a quantity of times that a mediation device M needs to move back and forth between a main device and target devices in an entire communication connection establishment process, that is, improves ease of operation.

For example, assuming that there are N target devices B, the mediation device M may need to perform N+2 taps, including: N+1 taps before the acquisition completion command is received, to complete collection of connection configuration information of all candidate devices D including the main device A and the N target devices B; and one tap after the device selection command is received, to acquire the connection configuration information of the main device A and implement handover initiation of the communication connection between the main device A and each target device B by the main device A. If the main device A is not tapped before the acquisition completion command is received, a quantity of needed taps may be even further reduced to N+1.

Besides, according the solution in the prior art, after acquiring connection configuration information of a target device, a mediation device automatically matches the connection configuration information with connection configuration information, which is saved in the mediation device, of a main device, and establishes a communication connection between the target device and the main device; however, at this time, if connection configuration information of another target device is saved in the mediation device, a misconnection between the two target devices may be caused. According to this embodiment of the present disclosure, after acquiring connection configuration information of a candidate device, a mediation device does not perform matching processing immediately, and instead saves the connection configuration information in a connection configuration information list; and after an identity of the candidate device is determined, a main device initiates initiation of a communication connection to each target device. This embodiment of the present disclosure effectively avoids a misconnection between target devices.

In a possible implementation manner, in step S104, the mediation device M may save only a particular type of acquired connection configuration information, for example, Bluetooth connection configuration information, in the connection configuration information list. In addition, in this implementation manner, in step S108, the mediation device M only needs to match saved Bluetooth connection configuration information with Bluetooth connection configuration information of the main device A. In a possible specific implementation manner, if a handover mediation response fed back by a candidate device D does not include the particular type of connection configuration information, for example, does not include Bluetooth connection configuration information, the mediation device M may output an alarm message, to prompt the user that the candidate device D does not support the particular type of connection.

In another possible implementation manner, in step S104, the mediation device M may save all types of acquired connection configuration information, for example, Bluetooth connection configuration information and Wi-Fi connection configuration information, in the connection configuration information list. In addition, in this implementation manner, in step S108, the mediation device M performs matching processing according to a connection type, for example, matches Bluetooth connection configuration information saved in the connection configuration information list with Bluetooth connection configuration information of the main device A, and matches Wi-Fi connection configuration information saved in the connection configuration information list with Wi-Fi connection configuration information of the main device A. Certainly, the mediation device M may perform preferential matching processing for a particular type of connection, for example, preferentially match Bluetooth connection configuration information saved in the connection configuration information list with Bluetooth connection configuration information of the main device A.

Figure 3A:
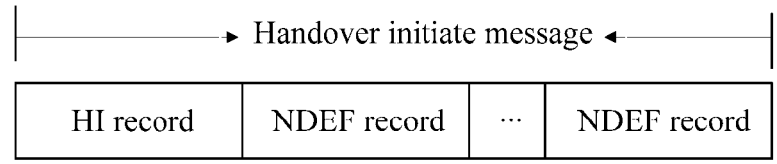
FIG. 3a is a schematic structural diagram of a handover initiate message defined according to the CH 1.3 Specification.
Figure 3B:
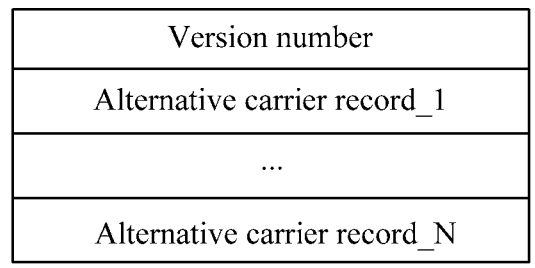
FIG. 3b is a schematic structural diagram of an Hi record in a handover initiate message defined according to the CH 1.3 Specification.
Figure 3C:
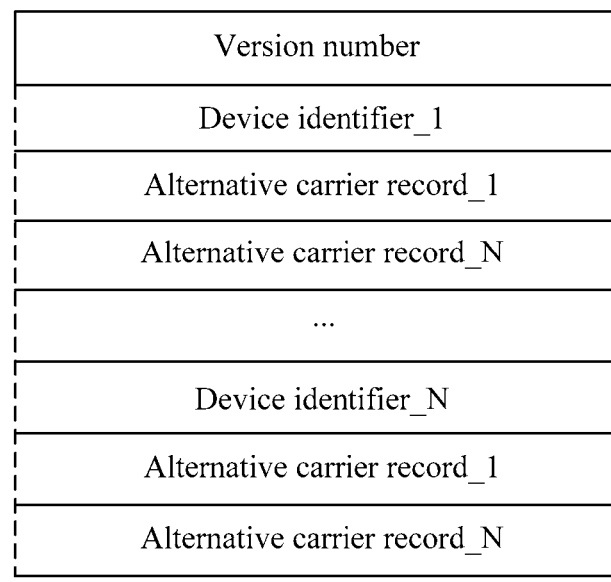
FIG. 3c is a schematic structural diagram of an extended Hi record according to an embodiment of the present disclosure.

Besides, both the handover initiate request and the handover initiate response in step S109 belong to handover initiate messages. According to a structure of a handover initiate message shown in FIG. 3a, the handover initiate message includes a handover initiate record ("Hi" record) and zero or more carrier configuration records, that is, connection configuration information in NFC data exchange format (NDEF) records. A handover initiate request should include at least one NDEF record for carrying connection configuration information, while a handover initiate response may include only an Hi record and no NDEF record (not shown in the figure), which mainly depends on whether a responding device accepts the handover initiate request. A structure of an Hi record is shown in FIG. 3b. An alternative carrier record ("ac" record) in the Hi record has a carrier data reference (CARRIER_DATA_REFERENCE) pointing to the foregoing NDEF record and an auxiliary data reference (AUXILIARY_DATA_REFERENCE) that may exist. An existing Hi record can include an ac of only one device, and each ac corresponds to one type of carrier (for example, Bluetooth or wife), that is, each handover initiate request and each handover initiate response can point to connection configuration information of only one device. In a possible implementation manner, an Hi record, defined in the CH 1.3 Specification, in a handover initiate message is extended in this embodiment of the present disclosure. A structure of an extended Hi record is shown in FIG. 3c, and may include alternative carrier records of multiple devices. Different devices are marked with device identifiers (DEVICE ID), and each device has a corresponding alternative carrier record. The alternative carrier records under the device identifiers may be used to point to connection configuration information in NDEF records of the devices. Structures of Hi records in a handover initiate request and a handover initiate response are extended separately, so that one handover initiate request and one handover initiate response each include all matching connection configuration information, thereby further achieving a technical effect of simplifying a communication connection establishment step.

Further, step S109 may also include other cases, and examples are as follows:

Case 1: The mediation device finally taps the main device only once (that is, the $(N+2)^{th}$ tap), and successively sends and receives N pairs of handover initiate requests/handover initiate responses after matching processing, where each pair of a handover initiate request/a handover initiate response include connection configuration information of only one target device. In this case, an Hi record in a handover initiate message does not need to be extended.

Case 2: The mediation device finally taps the main device only once, and successively sends and receives x (1<x<N) pairs of handover initiate requests/handover initiate responses after matching processing, where each pair of a handover initiate request/a handover initiate response include connection configuration information of y (1<y<N) target devices, and x×y=N. In this case, an Hi record in a handover initiate message needs to be extended.

Case 3: The mediation device finally taps the main device n times (1<n<N), and sends and receives one pair of a handover initiate request/a handover initiate response during each tap, where each pair of a handover initiate request/a handover initiate response include connection configuration information of m (1<m<N) target devices, and m×n=N. In this case, an Hi record in a handover initiate message needs to be extended.

Case 4: The mediation device finally taps the main device n times (1<n<N), and sends and receives m (1<m<N) pairs of handover initiate requests/handover initiate responses during each tap, where each pair of a handover initiate request/a handover initiate response include connection configuration information of one target device, and m×n=N. In this case, an Hi record in a handover initiate message does not need to be extended.

Case 5: The mediation device finally taps the main device n times, and sends and receives m' (0<m'<m) pairs of handover initiate requests/handover initiate responses during each tap, where each pair of a handover initiate request/a handover initiate response include connection configuration information of p (1<p<N) targets, and n×m'×p=N. In this case, an Hi record in a handover initiate message needs to be extended.

Case 6: The mediation device finally taps the main device N times, and sends and receives one pair of a handover initiate request/a handover initiate response during each tap, where each pair of a handover initiate request/a handover initiate response include connection configuration information of one target device. In this case, an Hi record in a handover initiate message does not need to be extended.

Embodiment 3

Figure 4:
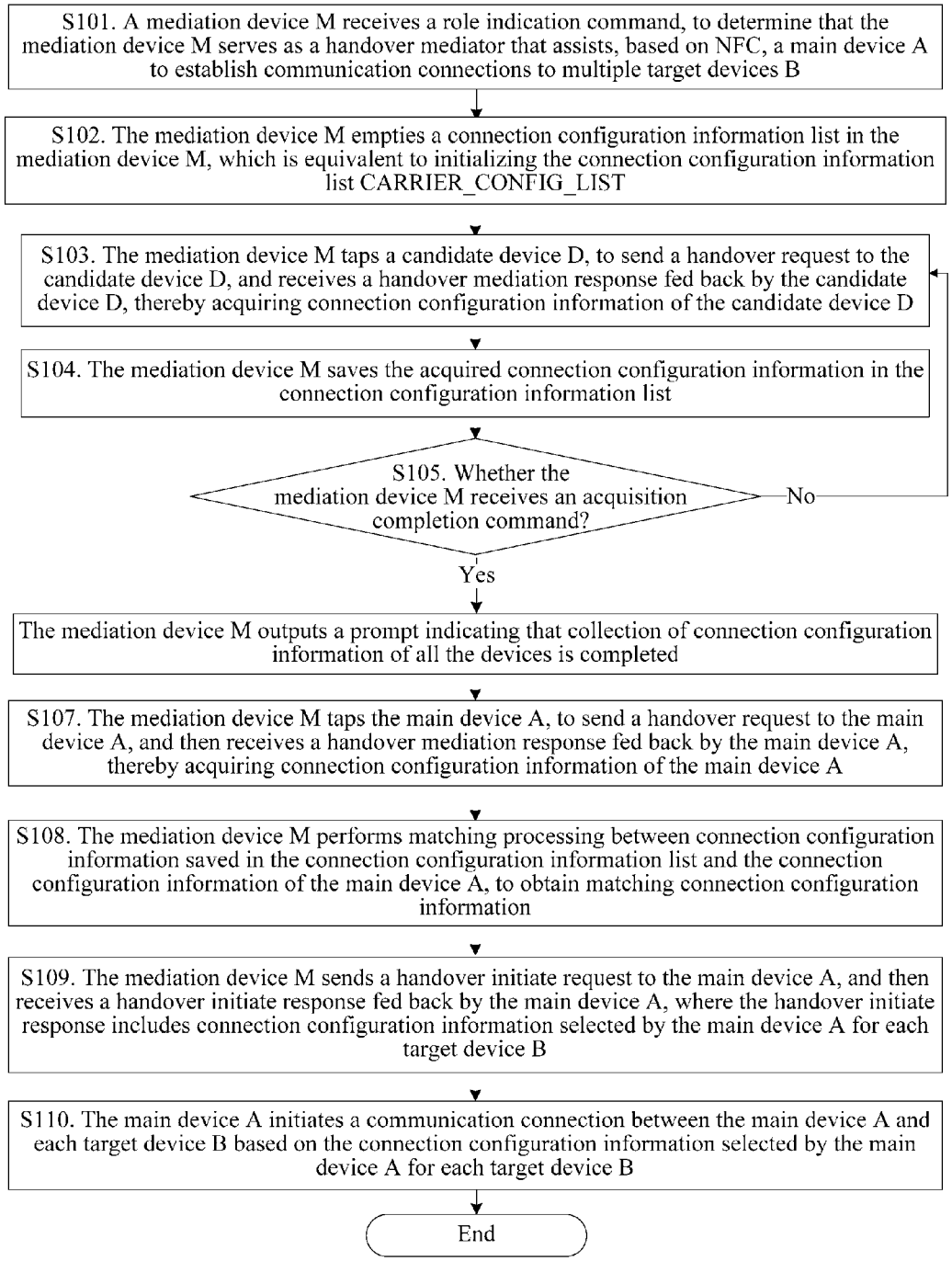
FIG. 4 is a flowchart of a communication connection establishment method according to Embodiment 3 of the present disclosure.

FIG. 4 is a flowchart of a communication connection establishment method according to Embodiment 3 of the present disclosure. As shown in FIG. 4, the method mainly includes:

Step S101: A mediation device M receives a role indication command, to determine that the mediation device M serves as a handover mediator that assists, based on NFC, a main device A to establish communication connections to multiple target devices B.

Step S102: The mediation device M empties a connection configuration information list in the mediation device M.

Step S103: The mediation device M taps a candidate device D, to send a handover request to the candidate device D, where the handover request may include a carrier type, and then receives a handover mediation response fed back by the candidate device D, where the handover mediation response includes connection configuration information of the candidate device D, so as to acquire the connection configuration information of the candidate device D.

Step S104: The mediation device M saves the acquired connection configuration information in the connection configuration information list.

Step S105: The mediation device M determines whether an acquisition completion command is received; and if no acquisition completion command is received, returns to step S103; or if an acquisition completion command is received, determines that collection of candidate connection configuration information is completed, and continues to perform step S107.

Step S107: The mediation device M taps the main device A, to send a handover request to the main device A, and then receives a handover mediation response fed back by the main device A, so as to acquire connection configuration information of the main device A. In a possible implementation manner, this step may further include: if the connection configuration information of the main device A is already recorded in the connection configuration information list, that is, the main device A is previously tapped as a candidate device D by the mediation device M, in response to a received device selection command, the mediation device M may ignore the connection configuration information of the main device A in the connection configuration information list, for example, delete the connection configuration information of the main device A or mark the connection configuration information of the main device A as unusable.

Step S108: The mediation device M performs matching processing between connection configuration information saved in the connection configuration information list and the connection configuration information of the main device A, to obtain matching connection configuration information.

In a possible implementation manner, this step may further include: if finding, during matching in the foregoing matching processing process, that a Media Access Control (MAC) address in connection configuration information of a candidate device is the same as a MAC address in the connection configuration information of the main device A acquired during the tap, the mediation device M may ignore the connection configuration information of the main device A in the connection configuration information list, for example, delete the connection configuration information of the main device A or mark the connection configuration information of the main device A as unusable.

Step S109: The mediation device M sends a handover initiate request to the main device A, where the handover initiate request includes connection configuration information of all the target devices B that matches the connection configuration information of the main device A; and then receives a handover initiate response fed back by the main device A, where the handover initiate response includes connection configuration information selected by the main device A for each target device B. Similar to Embodiment 2, step S109 may also include other cases, and details are not described herein.

Step S110: The main device A initiates a communication connection between the main device A and each target device B based on the connection configuration information selected by the main device A for each target device B.

As can be known by comparing FIG. 4 with FIG. 2 with reference to the foregoing descriptions, a main difference between this embodiment and Embodiment 2 lies in: step S106 is not performed, that is, no device selection command is used, and it is directly determined that the first device that is tapped after the acquisition completion command is received is the main device A, so that when the main device A is tapped, an identity of A as the main device is determined, and acquisition of the connection configuration information and matching processing are performed.

Therefore, most of the detailed explanations and special descriptions about Embodiment 2, for example, about a type of connection configuration information saved in the connection configuration information list, about matching processing on connection configuration information, and about the extension of a handover initiate message, are also applicable to this embodiment, and details are not described herein.

Similar to Embodiment 2, the communication connection establishment method according to this embodiment can also obviously improve ease of operation. For example, assuming that the mediation device M needs to assist the main device A to establish communication connections to N target devices B, in an entire communication connection establishment process in this embodiment, the mediation device M may need to perform N+2 taps, including: N+1 taps before the acquisition completion command is received, to complete collection of connection configuration information of all candidate devices D including the main device A and the N target devices B; and one tap after the acquisition completion command is received, to acquire the connection configuration information of the main device A and implement handover initiation of the communication connection between the main device A and each target device B by the main device A. If the main device A is not tapped before the acquisition completion command is received, a quantity of needed taps may be even further reduced to N+1. That is, a quantity of taps needed in this embodiment is similar to that in Embodiment 2.

Similar to Embodiment 2, the communication connection establishment method according to this embodiment can also avoid a misconnection between target devices, and details are not described herein.

In a possible implementation manner, similar to Embodiment 2, after receiving an acquisition completion command, that is, in a case in which a determining result in step S105 is yes, the mediation device M may further prompt a user that collection of connection configuration information of all the candidate devices is completed, to remind the user to use the mediation device M to tap the main device A, that is, perform step S107.

Embodiment 4

FIG. 5 is a flowchart of a communication connection establishment method according to Embodiment 4 of the present disclosure. As shown in FIG. 5, the method mainly includes:

Step S101: A mediation device M receives a role indication command, to determine that the mediation device M serves as a handover mediator that assists, based on NFC, a main device A to establish communication connections to multiple target devices B. In addition, step S101 may not be performed, and a subsequent objective can also be achieved by performing steps S102 and S301 at the beginning.

Step S102: The mediation device M empties a connection configuration information list in the mediation device M.

Step S301: The mediation device M selects a many-to-one mode, to determine to first tap the target devices and then tap the main device.

Step S103: The mediation device M taps a target device B, to send a handover request to the target device B, where the handover request may include a carrier type, and then receives a handover mediation response fed back by the target device B, where the handover mediation response includes connection configuration information of the target device B, so as to acquire the connection configuration information of the target device B.

Step S104: The mediation device M saves the acquired connection configuration information in the connection configuration information list.

Step S105: The mediation device M determines whether an acquisition completion command is received; and if no acquisition completion command is received, returns to step S103; or if an acquisition completion command is received, determines that collection of candidate connection configuration information is completed, and continues to perform step S107.

Step S107: The mediation device M taps the main device A, to send a handover request to the main device A, and then receives a handover mediation response fed back by the main device A, so as to acquire connection configuration information of the main device A.

Step S108: The mediation device M performs matching processing between connection configuration information saved in the connection configuration information list and the connection configuration information of the main device A, to obtain matching connection configuration information.

Step S109: The mediation device M sends a handover initiate request to the main device A, where the handover initiate request includes connection configuration information of all the target devices B that matches the connection configuration information of the main device A; and then receives a handover initiate response fed back by the main device A, where the handover initiate response includes connection configuration information selected by the main device A for each target device B. Similar to Embodiment 2, step S109 may also include other cases, and details are not described herein.

Step S110: The main device A initiates a communication connection between the main device A and each target device B based on the connection configuration information selected by the main device A for each target device B.

As can be known by comparing FIG. 5 with FIG. 2 with reference to the foregoing descriptions, a main difference between this embodiment and Embodiment 2 lies in: step S106 is replaced with step S301, that is, no device selection command is used, and identities of the main device and the target devices are determined according to the selected many-to-one (that is, a tap sequence is first tapping the target devices and then tapping the main device) mode.

Therefore, most of the detailed explanations and special descriptions about Embodiment 2, for example, about a type of connection configuration information saved in the connection configuration information list, about matching processing on connection configuration information, and about the extension of a handover initiate message, are also applicable to this embodiment, and details are not described herein. In addition, similar to Embodiment 2 and Embodiment 3, the communication connection establishment method according to this embodiment can also obviously improve ease of operation.

For example, assuming that the mediation device M needs to assist the main device A to establish communication connections to N target devices B, in an entire communication connection establishment process in this embodiment, the mediation device M may need to perform only N+1 taps, including: N taps before the acquisition completion command is received, to complete collection of connection configuration information of the N target devices B; and one tap after the acquisition completion command is received, to acquire the connection configuration information of the main device A and implement handover initiation of the communication connection between the main device A and each target device B by the main device A. That is, a quantity of taps needed in this embodiment is one less than those in Embodiment 2 and Embodiment 3.

Similar to Embodiment 2, the communication connection establishment method according to this embodiment can also avoid a misconnection between target devices, and details are not described herein.

In a possible implementation manner, similar to Embodiment 2 and Embodiment 3, after receiving an acquisition completion command, that is, in a case in which a determining result in step S105 is yes, the mediation device M may further prompt a user that collection of connection configuration information of all the target devices B is completed, to remind the user to use the mediation device M to tap the main device A, that is, perform step S107.

It should be noted that although FIG. 5 shows that step S301 is performed after step S102, a person skilled in the art can understand that the present disclosure is not limited thereto. In fact, step S301 may be performed before step S102, or may be performed simultaneously with step S102, as long as a tap sequence between the target devices and the main device can be determined before step S107.

Embodiment 5

Figure 6A:
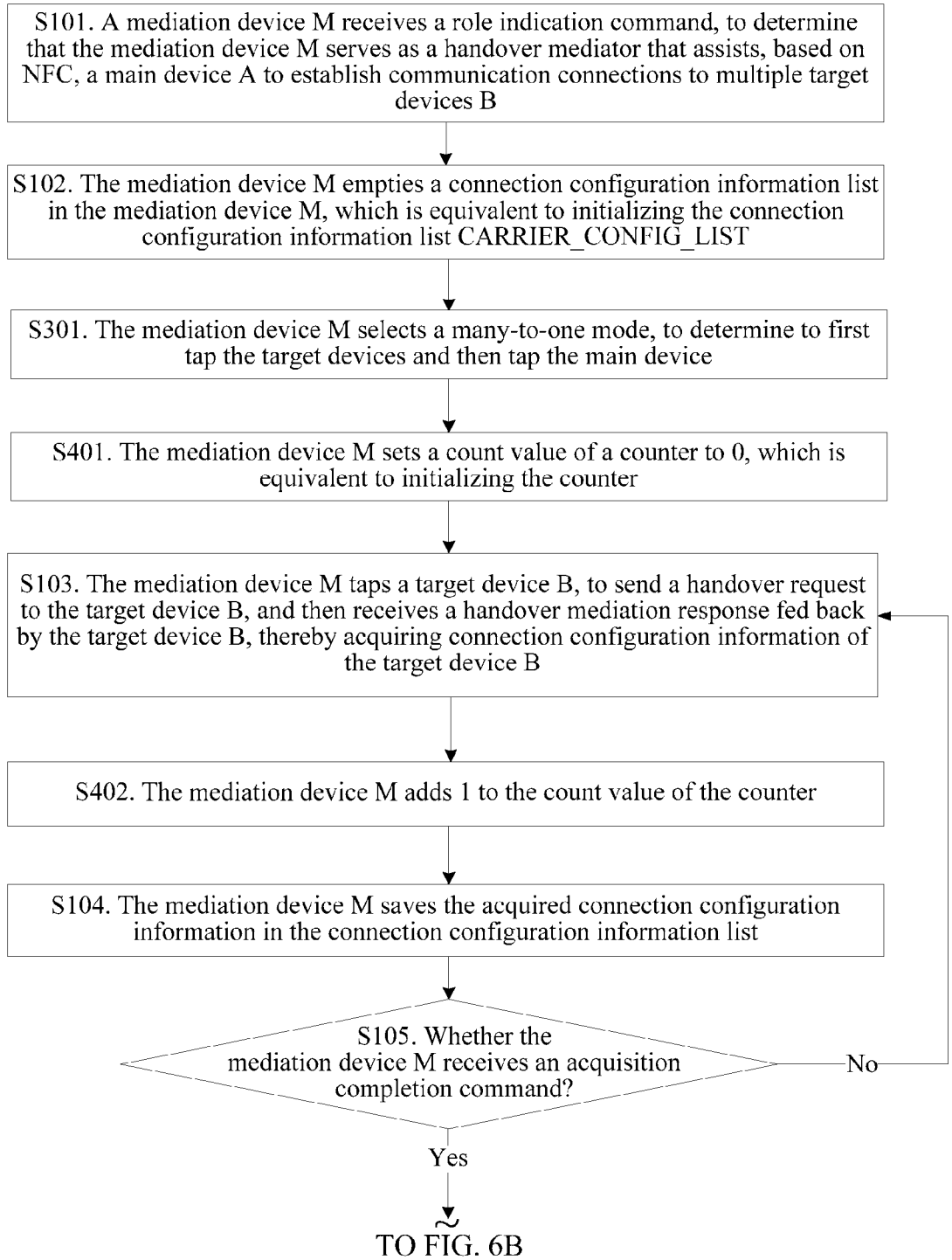
FIG. 6A and FIG. 6B are a flowchart of a communication connection establishment method according to Embodiment 5 of the present disclosure.
Figure 6B:
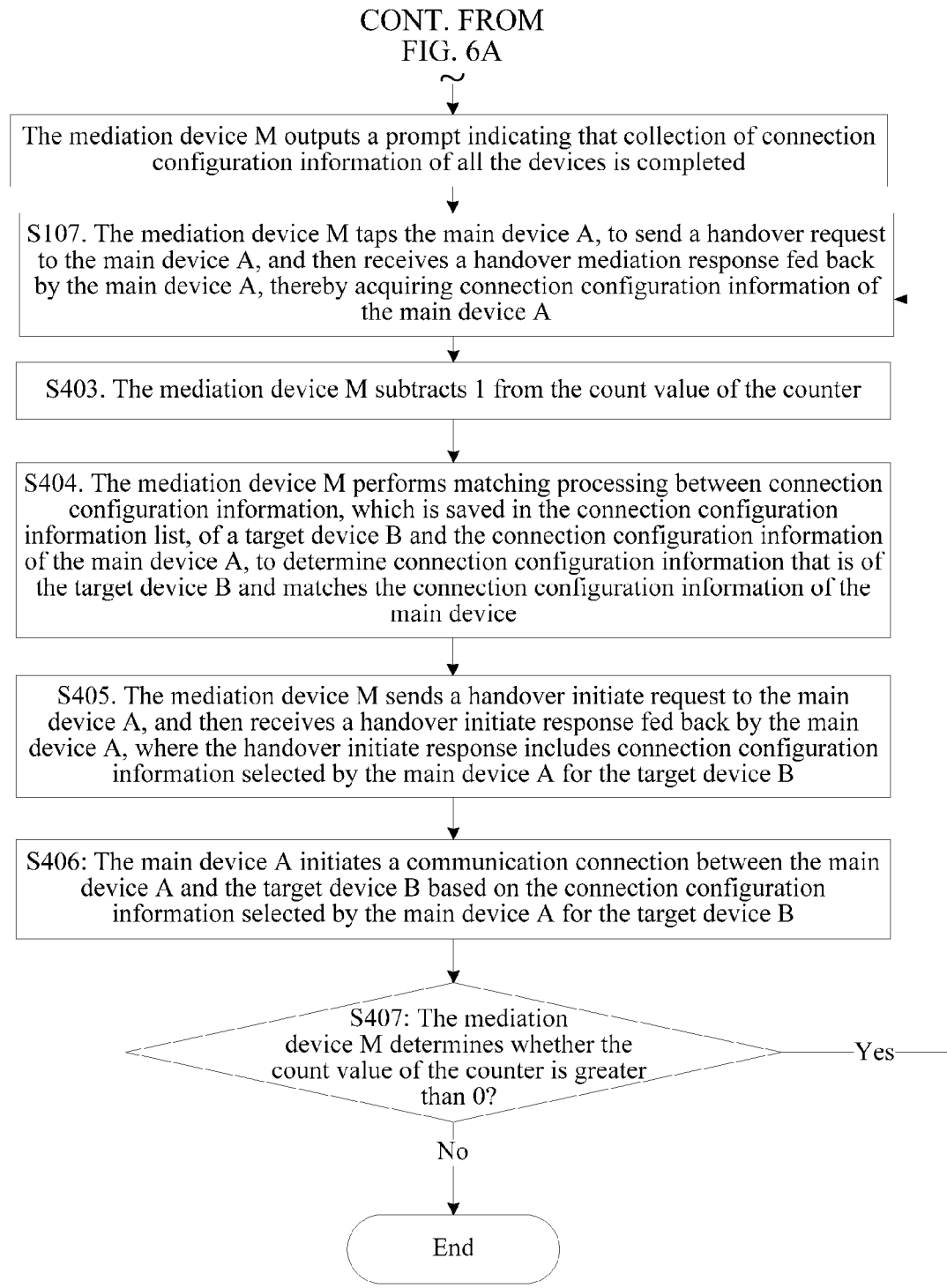

FIG. 6A and FIG. 6B are a flowchart of a communication connection establishment method according to Embodiment 5 of the present disclosure. As shown in FIG. 6A and FIG. 6B, the method mainly includes:

Step S101: A mediation device M receives a role indication command, to determine that the mediation device M serves as a handover mediator that assists, based on NFC, a main device A to establish communication connections to multiple target devices B. In addition, step S101 may not be performed, and a subsequent objective can also be achieved by performing steps S102 and S301 at the beginning.

Step S102: The mediation device M empties a connection configuration information list in the mediation device M.

Step S301: The mediation device M selects a many-to-one mode, to determine to first tap the target devices and then tap the main device.

Step S401: The mediation device M sets a count value of a counter to 0, which is equivalent to initializing the counter. Step S401 may be performed before S301.

Step S103: The mediation device M taps a target device B, to send a handover request to the target device B, where the handover request may include a carrier type, and then receives a handover mediation response fed back by the target device B, where the handover mediation response includes connection configuration information of the target device B, so as to acquire the connection configuration information of the target device B.

Step S402: The mediation device M adds 1 to the count value of the counter. S402 may be performed at a moment after S104 and before S105.

Step S104: The mediation device M saves the acquired connection configuration information in the connection configuration information list.

Step S105: The mediation device M determines whether an acquisition completion command is received; and if no acquisition completion command is received, returns to step S103; or if an acquisition completion command is received, determines that collection of candidate connection configuration information is completed, and continues to perform step S107.

Step S107: The mediation device M taps the main device A, to send a handover request to the main device A, and then receives a handover mediation response fed back by the main device A, so as to acquire connection configuration information of the main device A.

Step S403: The mediation device M subtracts 1 from the count value of the counter.

Step S404: The mediation device M performs matching processing between connection configuration information, which is saved in the connection configuration information list, of a target device B and the connection configuration information of the main device A, to determine connection configuration information that is of the target device B and matches the connection configuration information of the main device A.

Step S405: The mediation device M sends a handover initiate request to the main device A, where the handover initiate request includes the determined connection configuration information, which matches the connection configuration information of the main device A, of the target device B; and then receives a handover initiate response fed back by the main device A, where the handover initiate response includes connection configuration information selected by the main device A for the target device B.

Step S406: The main device A initiates a communication connection between the main device A and the target device B based on the connection configuration information selected by the main device A for the target device B.

Step S407: The mediation device M determines whether the count value of the counter is greater than 0; and if yes, returns to step S107; otherwise, end this procedure.

As can be known by comparing FIG. 6A and FIG. 6B with FIG. 5 with reference to the foregoing descriptions, a main difference between this embodiment and Embodiment 4 lies in: step S401 is added between step S301 and step S103, and step S402 is added between step 103 and step S104, to count a quantity of target devices B; and steps S108 to S110 are replaced with steps S403 to S407, to sequentially implement handover initiation of the communication connection between the main device A and each target device B by the main device A by successively tapping the main device A, so that an Hi record in the CH 1.3 Specification does not need to be extended to include connection configuration information of multiple target devices B.

Therefore, most of the detailed explanations and special descriptions about Embodiment 2 to Embodiment 4, for example, about a type of connection configuration information saved in the connection configuration information list and about matching processing on connection configuration information, are also applicable to this embodiment, and details are not described herein. In addition, similar to Embodiment 2 to Embodiment 4, the communication connection establishment method according to this embodiment can also obviously improve ease of operation.

For example, assuming that the mediation device M needs to assist the main device A to establish communication connections to N target devices B, in an entire communication connection establishment process in this embodiment, the mediation device M may need to perform a maximum of 2N taps, including: N taps before the acquisition completion command is received, to complete collection of connection configuration information of the N target devices B; and N taps after the acquisition completion command is received, to acquire the connection configuration information of the main device A and implement handover initiation of the communication connection between the main device A and each target device B by the main device A. A quantity of taps needed in this embodiment is increased from N+1 to 2N compared with that in Embodiment 4. However, because a handover initiate message in the existing CH 1.3 Specification does not need to be extended, and the N later taps are performed successively beside the main device A, that is, a user does not need to move the mediation device M back and forth between the main device A and each target device B, the communication connection establishment method according to this embodiment can still effectively improve ease of user operation.

Similar to Embodiment 2, the communication connection establishment method according to this embodiment can also avoid a misconnection between target devices, and details are not described herein.

In a possible implementation manner, similar to Embodiment 2 to Embodiment 4, after receiving an acquisition completion command, that is, in a case in which a determining result in step S105 is yes, the mediation device M may further prompt the user that collection of connection configuration information of all the target devices B is completed, to remind the user to use the mediation device M to tap the main device A, that is, perform step S107.

It should be noted that, similar to Embodiment 4, although FIG. 6A and FIG. 6B show that step S301 is performed after step S102, the present disclosure is not limited thereto. In fact, step S301 may be performed before step S102, or may be performed simultaneously with step S102, as long as a tap sequence between the main device and the target devices can be determined before step S107.

Besides, although FIG. 6A and FIG. 6B show that step S403 is performed before step S404, the present disclosure is not limited thereto. In fact, step S403 may be performed after any one of steps S404, S405, and S406, as long as updating of the count value of the counter can be completed after step S107 and before step S407.

Embodiment 6

Figure 7A:
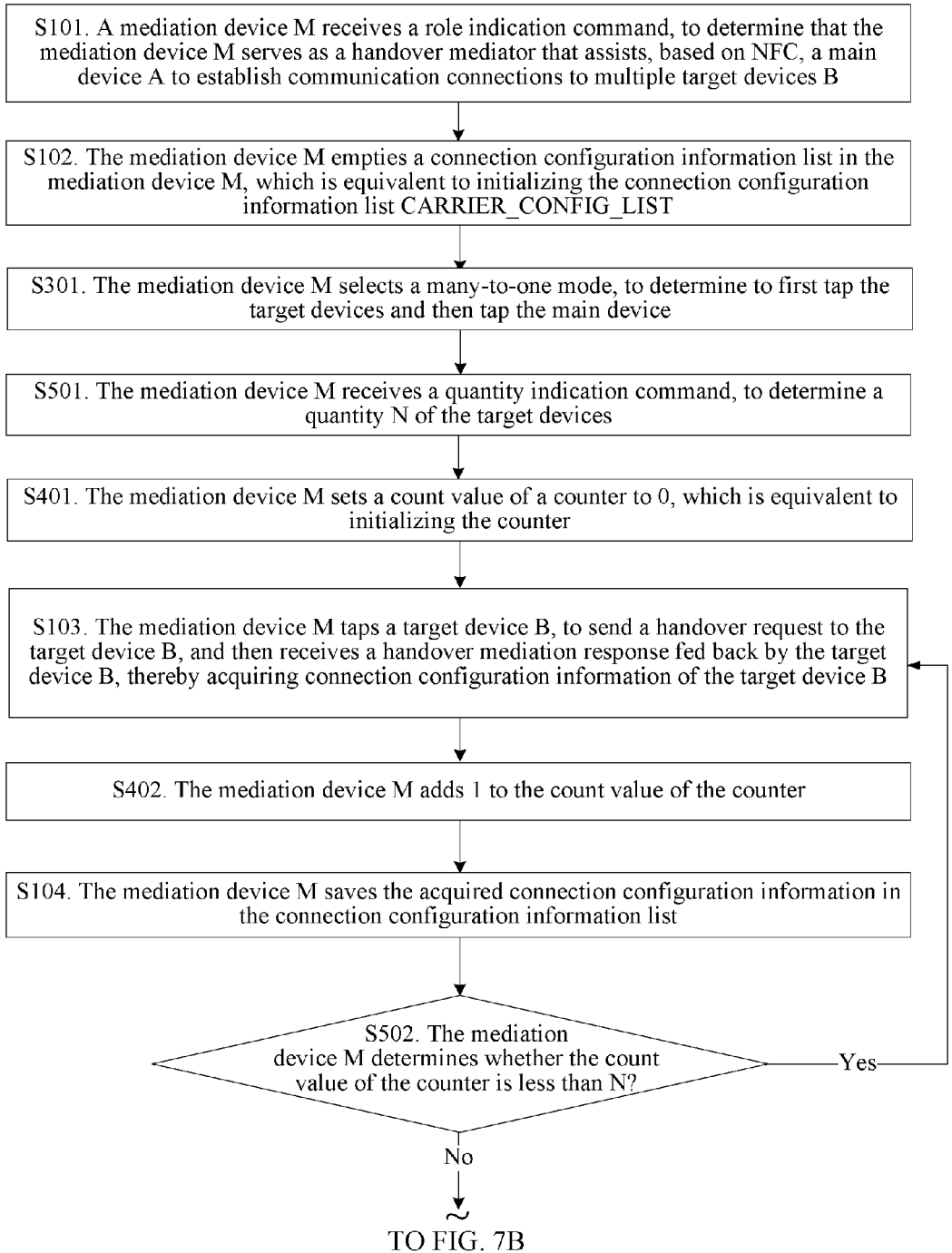

FIG. 7A and FIG. 7B are a flowchart of a communication connection establishment method according to Embodiment 6 of the present disclosure. As shown in FIG. 7A and FIG. 7B, the method mainly includes:

Step S101: A mediation device M receives a role indication command, to determine that the mediation device M serves as a handover mediator that assists, based on NFC, a main device A to establish communication connections to multiple target devices B. In addition, step S101 may not be performed, and a subsequent objective can also be achieved by performing steps S102 and S301 at the beginning.

Step S102: The mediation device M empties a connection configuration information list in the mediation device M.

Step S301: The mediation device M selects a many-to-one mode, to determine to first tap the target devices and then tap the main device.

Step S501: The mediation device M receives a quantity indication command, to determine a quantity N of the target devices.

Step S401: The mediation device M sets a count value of a counter to 0.

Step S103: The mediation device M taps a target device B, to send a handover request to the target device B, where the handover request may include a carrier type, and then receives a handover mediation response fed back by the target device B, where the handover mediation response includes connection configuration information of the target device B, so as to acquire the connection configuration information of the target device B.

Step S402: The mediation device M adds 1 to the count value of the counter.

Step S104: The mediation device M saves the acquired connection configuration information in the connection configuration information list.

Step S502: The mediation device M determines whether the count value of the counter is less than N; and if yes, returns to step S103; or if not, determines that collection of candidate connection configuration information is completed, and continues to perform step S107.

Step S107: The mediation device M taps the main device A, to send a handover request to the main device A, and then receives a handover mediation response fed back by the main device A, so as to acquire connection configuration information of the main device A.

Step S108: The mediation device M performs matching processing between connection configuration information saved in the connection configuration information list and the connection configuration information of the main device A, to obtain matching connection configuration information.

Step S109: The mediation device M sends a handover initiate request to the main device A, where the handover initiate request includes connection configuration information of all the target devices B that matches the connection configuration information of the main device A; and then receives a handover initiate response fed back by the main device A, where the handover initiate response includes connection configuration information selected by the main device A for each target device B. Similar to Embodiment 2, step S109 may also include other cases, and details are not described herein.

Step S110: The main device A initiates a communication connection between the main device A and each target device B based on the connection configuration information selected by the main device A for each target device B.

As can be known by comparing FIG. 7A and FIG. 7B with FIG. 6A and FIG. 6B with reference to the foregoing descriptions, a main difference between this embodiment and Embodiment 5 lies in: step S501 is added before step S401, and step 105 is replaced with step 502, to determine, based on the set quantity N of the target devices, whether collection of candidate connection configuration information is completed, and no acquisition completion command needs to be used; and steps S403 to S407 are replaced with steps S108 to S110, to implement handover initiation of the communication connection between the main device A and each target device B by the main device A by tapping the main device A only once, and the main device A does not need to be successively tapped multiple times.

Therefore, most of the detailed explanations and special descriptions about Embodiment 2 to Embodiment 5, for example, about a type of connection configuration information saved in the connection configuration information list, about matching processing on connection configuration information, and about the extension of a handover initiate message, are also applicable to this embodiment, and details are not described herein. In addition, similar to Embodiment 2 to Embodiment 5, the communication connection establishment method according to this embodiment can also obviously improve ease of operation.

For example, assuming that the mediation device M needs to assist the main device A to establish communication connections to N target devices B, in an entire communication connection establishment process in this embodiment, the mediation device M may need to perform N+1 taps, including: first N taps, to complete collection of connection configuration information of the N target devices B; and one later tap, to acquire the connection configuration information of the main device A and implement handover initiation of a communication connection between the main device A and each target device B by the main device A. That is, a quantity of taps needed in this embodiment is same as that in Embodiment 4.

Similar to Embodiment 2, the communication connection establishment method according to this embodiment can also avoid a misconnection between target devices, and details are not described herein.

In a possible implementation manner, similar to Embodiment 2 to Embodiment 5, after tapping N target devices B, that is, in a case in which a determining result in step S502 is yes, the mediation device M may further prompt a user that collection of connection configuration information of all the target devices B is completed, to remind the user to use the mediation device M to tap the main device A, that is, perform step S107.

It should be noted that, similar to Embodiment 4 and Embodiment 5, although FIG. 7A and FIG. 7B show that step S301 is performed after step S102, the present disclosure is not limited thereto. In fact, step S301 may be performed before step S102, or may be performed simultaneously with step S102, as long as a tap sequence between the main device and the target devices can be determined before step S107.

Besides, although FIG. 7A and FIG. 7B show that step S501 is performed before step S401, the present disclosure is not limited thereto. In fact, step S501 may be combined with step S401, or may be performed before any one of steps S102, S301, and S401, as long as the quantity of the target devices can be determined before step S103.

Moreover, although FIG. 7A and FIG. 7B show that step S402 is performed before step S404, the present disclosure is not limited thereto. In fact, step S402 may be performed after step S104, as long as updating of the count value of the counter can be completed after step S103 and before step S502.

Embodiment 7

Figure 8A:
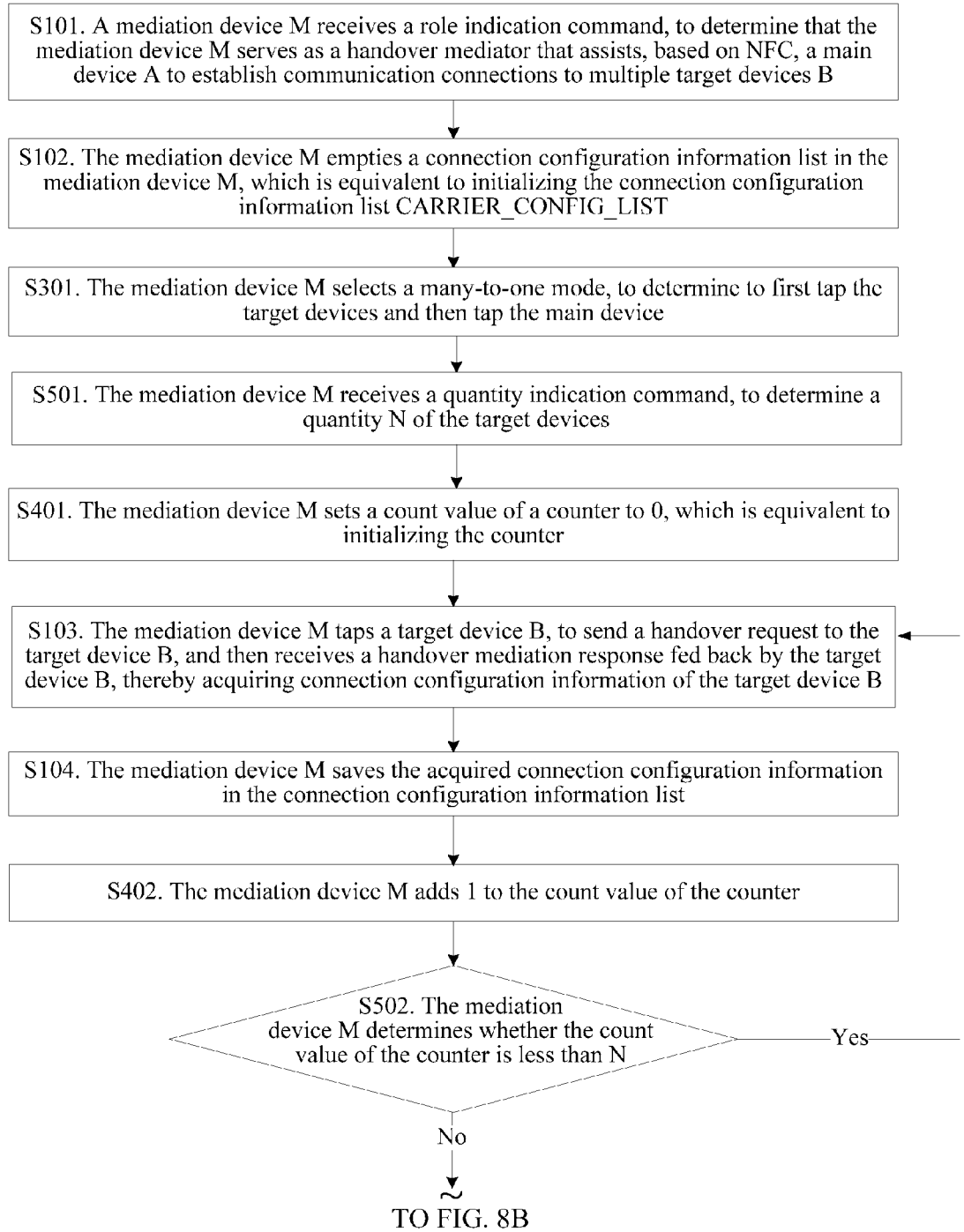
FIG. 8A and FIG. 8B are a flowchart of a communication connection establishment method according to Embodiment 7 of the present disclosure.
Figure 8B:
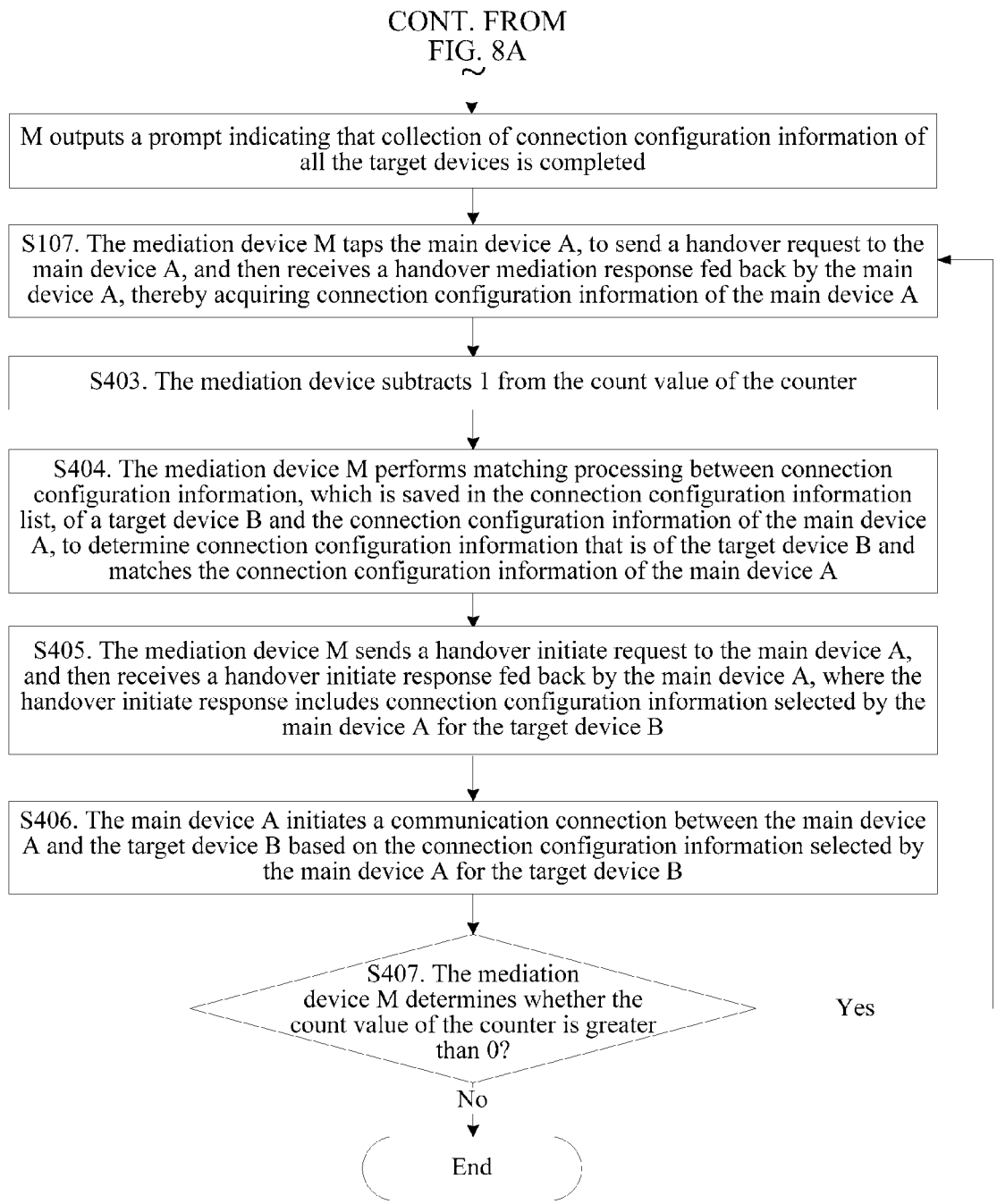

FIG. 8A and FIG. 8B are a flowchart of a communication connection establishment method according to Embodiment 7 of the present disclosure. As shown in FIG. 8A and FIG. 8B, the method mainly includes:

Step S101: A mediation device M receives a role indication command, to determine that the mediation device M serves as a handover mediator that assists, based on NFC, a main device A to establish communication connections to multiple target devices B. In addition, step S101 may not be performed, and a subsequent objective can also be achieved by performing steps S102 and S301 at the beginning.

Step S102: The mediation device M empties a connection configuration information list in the mediation device M.

Step S301: The mediation device M selects a many-to-one mode, to determine to first tap the target devices and then tap the main device.

Step S501: The mediation device M receives a quantity indication command, to determine a quantity N of the target devices.

Step S401: The mediation device M sets a count value of a counter to 0.

Step S103: The mediation device M taps a target device B, to send a handover request to the target device B, where the handover request may include a carrier type, and then receives a handover mediation response fed back by the target device B, where the handover mediation response includes connection configuration information of the target device B, so as to acquire the connection configuration information of the target device B.

Step S104: The mediation device M saves the acquired connection configuration information in the connection configuration information list.

Step S402: The mediation device M adds 1 to the count value of the counter.

Step S502: The mediation device M determines whether the count value of the counter is less than N; and if yes, returns to step S103; or if not, determines that collection of candidate connection configuration information is completed, and continues to perform step S107.

Step S107: The mediation device M taps the main device A, to send a handover request to the main device A, and then receives a handover mediation response fed back by the main device A, so as to acquire connection configuration information of the main device A.

Step S403: The mediation device subtracts 1 from the count value of the counter.

Step S404: The mediation device M performs matching processing between connection configuration information, which is saved in the connection configuration information list, of a target device B and the connection configuration information of the main device A, to determine connection configuration information that is of the target device B and matches the connection configuration information of the main device A.

Step S405: The mediation device M sends a handover initiate request to the main device A, where the handover initiate request includes the determined connection configuration information, which matches the connection configuration information of the main device A, of the target device B; and then receives a handover initiate response fed back by the main device A, where the handover initiate response includes connection configuration information selected by the main device A for the target device B.

Step S406: The main device A initiates a communication connection between the main device A and the target device B based on the connection configuration information selected by the main device A for the target device B.

Step S407: The mediation device M determines whether the count value of the counter is greater than 0; and if yes, returns to step S107; otherwise, end this procedure.

As can be known by comparing FIG. 8A and FIG. 8B with FIG. 7A and FIG. 7B with reference to the foregoing descriptions, a main difference between this embodiment and Embodiment 6 lies in: steps S108 to S110 are replaced with steps S403 to S407, to sequentially implement handover initiation of the communication connection between the main device A and each target device B by the main device A by successively tapping the main device A, so that an Hi record in the CH 1.3 Specification does not need to be extended to include connection configuration information of multiple target devices B.

Therefore, most of the detailed explanations and special descriptions about Embodiment 2 to Embodiment 6, for example, about a type of connection configuration information saved in the connection configuration information list and about matching processing on connection configuration information, are also applicable to this embodiment, and details are not described herein. In addition, similar to Embodiment 2 to Embodiment 6, the communication connection establishment method according to this embodiment can also obviously improve ease of operation.

For example, assuming that the mediation device M needs to assist the main device A to establish communication connections to N target devices B, in an entire communication connection establishment process in this embodiment, the mediation device M may need to perform a maximum of 2N taps, including: first N taps, to complete collection of connection configuration information of the N target devices B; and N later taps, to acquire the connection configuration information of the main device A and implement handover initiation of the communication connection between the main device A and each target device B by the main device A. A quantity of taps needed in this embodiment is increased from N+1 to 2N compared with that in Embodiment 6. However, same as Embodiment 5, because a handover initiate message in the existing CH 1.3 Specification does not need to be extended, and the N later taps are performed successively beside the main device A, that is, a user does not need to move the mediation device M back and forth between the main device A and each target device B, the communication connection establishment method according to this embodiment can still effectively improve ease of user operation.

Similar to Embodiment 2, the communication connection establishment method according to this embodiment can also avoid a misconnection between target devices, and details are not described herein.

In a possible implementation manner, similar to Embodiment 2 to Embodiment 6, after tapping N target devices B, that is, in a case in which a determining result in step S502 is yes, the mediation device M may further prompt the user that collection of connection configuration information of all the target devices B is completed, to remind the user to use the mediation device M to tap the main device A, that is, perform step S107.

It should be noted that, similar to Embodiment 4 to Embodiment 6, although FIG. 8A and FIG. 8B show that step S301 is performed after step S102, the present disclosure is not limited thereto. In fact, step S301 may be performed before step S102, or may be performed simultaneously with step S102, as long as a tap sequence between the main device and the target devices can be determined before step S107.

Besides, similar to Embodiment 6, although FIG. 8A and FIG. 8B show that step S501 is performed before step S401, the present disclosure is not limited thereto. In fact, step S501 may be performed before any one of steps S102, S301, and S401, as long as the quantity of the target devices can be determined before step S103.

Moreover, although FIG. 8A and FIG. 8B show that step S403 is performed before step S404, the present disclosure is not limited thereto. In fact, step S403 may be performed after any one of steps S404, S405, and S406, as long as updating of the count value of the counter can be completed after step S107 and before step S407.

Embodiment 8

FIG. 9 is a flowchart of a communication connection establishment method according to Embodiment 8 of the present disclosure. As shown in FIG. 9, the method mainly includes:

Step S101: A mediation device M receives a role indication command, to determine that the mediation device M serves as a handover mediator that assists, based on NFC, a main device A to establish communication connections to multiple target devices B. In this embodiment, this step may be omitted, and step S701 is directly performed.

Step S701: The mediation device M selects a one-to-many mode, to determine to first tap the main device and then tap the target devices.

Step S702: The mediation device M taps the main device A, sends a handover request to the main device A, where the handover request may include a carrier type, and then receives a handover mediation response fed back by the main device A, where the handover mediation response includes connection configuration information of the main device A, so as to acquire the connection configuration information of the main device A.

Step S703: The mediation device M taps a target device B, sends a handover request to the target device B, and then receives a handover mediation response fed back by the target device B, so as to acquire connection configuration information of the target device B.

Step S704: The mediation device M performs matching processing between the connection configuration information of the target device B and the connection configuration information of the main device A, to determine connection configuration information that is of the main device A and matches the connection configuration information of the target device B.

Step S705: The mediation device M sends a handover initiate request to the target device B, where the handover initiate request includes the connection configuration information, which matches the connection configuration information of the target device B, of the main device A; and then receives a handover initiate response fed back by the target device B, where the handover initiate response includes connection configuration information selected by the target device B for the main device A.

Step S706: The target device B initiates a communication connection between the target device B and the main device A based on the connection configuration information selected by the target device B for the main device A.

Step S707: The mediation device M saves the connection configuration information of the main device A, and releases the connection configuration information of the target device B, for example, deletes the connection configuration information of the target device B or marks the connection configuration information of the target device B as unusable.

Step S708: The mediation device M determines whether an establishment completion command is received; and if no establishment completion command is received, returns to step S703; or if an establishment completion command is received, ends this procedure.

For step S707, in a possible implementation manner, the mediation device M may save only a particular type of connection configuration information, for example, Bluetooth connection configuration information, of the main device A. In addition, in this implementation manner, in step S704, the mediation device M only needs to match saved Bluetooth connection configuration information with Bluetooth connection configuration information of the target device B. In a possible specific implementation manner, if a handover mediation response fed back by a target device B does not include the particular type of connection configuration information, for example, does not include Bluetooth connection configuration information, the mediation device M may output an alarm message, to prompt a user that the target device B does not support the particular type of connection.

Alternatively, in another possible implementation manner, in step S707, the mediation device M may save all types of connection configuration information, for example, Bluetooth connection configuration information and Wi-Fi connection configuration information, of the main device A. In addition, in this implementation manner, in step S704, the mediation device M performs matching processing according to a connection type, for example, matches saved Bluetooth connection configuration information with Bluetooth connection configuration information of the target device B, and matches saved Wi-Fi connection configuration information with Wi-Fi connection configuration information of the target device B. Certainly, the mediation device M may perform preferential matching processing for a particular type of connection, for example, preferentially match Bluetooth connection configuration information saved in a connection configuration information list with Bluetooth connection configuration information of the main device A.

Besides, in a possible implementation manner, similar to Embodiment 2 to Embodiment 7, the mediation device M may save the connection configuration information of the main device A by using the connection configuration information list. In this implementation manner, step S102 needs to be performed before step S702, so that the mediation device M empties the connection configuration information list in the mediation device M.

As can be known by comparing FIG. 9 with FIG. 5 with reference to the foregoing descriptions, a main difference between this embodiment and Embodiment 4 lies in: step S301 is replaced with step S701, so that identities of the main device and the target devices are determined according to the selected one-to-many (that is, a tap sequence is first tapping the main device and then tapping the target devices) mode, and the identities of the main device and the target devices are not determined according to a many-to-one (that is, a tap sequence is first tapping the target devices and then tapping the main device) mode; and steps S103 to S105 are replaced with step S702, and steps S107 to S110 are replaced with steps S703 to 708, so that the mediation device M saves the connection configuration information of the main device A until the establishment completion command is received, and before the establishment completion command is received, each time the mediation device M taps a target device B, the mediation device M acquires connection configuration information of the target device B and implements handover initiation of the main device A by the target device B.

In other words, after the identities of the main device and the target devices are determined based on the one-to-many mode, the mediation device M saves the connection configuration information of the main device A until the establishment completion command is received, and before the establishment completion command is received, each time the mediation device M taps a target device B, the mediation device M acquires connection configuration information of the target device B and implements handover initiation of the main device A by the target device B. The communication connection establishment method according to this embodiment obviously reduces a quantity of taps need to be performed by the mediation device M in an entire communication connection establishment process, that is, improves ease of operation.

For example, assuming that the mediation device M needs to assist the main device A to establish communication connections to N target devices B, in the entire communication connection establishment process in this embodiment, the mediation device M may need to perform only N+1 taps, including: first one tap, to complete collection of the connection configuration information of the main device A; and N later taps, to complete collection of connection configuration information of the N target devices B and implement handover initiation of the main device A by each target device B. That is, a quantity of taps needed in this embodiment is same as that in Embodiment 4 and Embodiment 6. Besides, in this embodiment, the mediation device M saves the connection configuration information of the main device A and releases the connection configuration information of the target devices B, which can effectively avoid a misconnection between the target devices B. Therefore, similar to Embodiment 2 to Embodiment 7, the communication connection establishment method according to this embodiment can also achieve a beneficial effect of effectively avoiding a misconnection and obviously improving ease of operation.

In a possible implementation manner, after receiving the establishment completion command, that is, in a case in which a determining result in step S708 is yes, the mediation device M may further prompt the user that all the target devices B have established communication connections to the main device, to remind the user that the entire communication connection establishment process is completed.

It should be noted that although FIG. 9 shows that step S701 is performed before step S702, a person skilled in the art should be able to understand that the present disclosure is not limited thereto. In fact, step S701 may be performed after step S702, or may be performed simultaneously with step S702, as long as a tap sequence between the main device and the target devices can be determined before step S703.

Embodiment 9

FIG. 10 is a flowchart of a communication connection establishment method according to Embodiment 9 of the present disclosure. As shown in FIG. 10, the method mainly includes:

Step S101: A mediation device M receives a role indication command, to determine that the mediation device M serves as a handover mediator that assists, based on NFC, a main device A to establish communication connections to multiple target devices B. In this embodiment, this step may be omitted, and step S701 is directly performed.

Step S701: The mediation device M selects a one-to-many mode, to determine to first tap the main device and then tap the target devices.

Step S702: The mediation device M taps the main device A, sends a handover request to the main device A, where the handover request may include a carrier type, and then receives a handover mediation response fed back by the main device A, where the handover mediation response includes connection configuration information of the main device A, so as to acquire the connection configuration information of the main device A.

Step S801: The mediation device M receives a quantity indication command, to determine a quantity N of the target devices B.

Step S802: The mediation device M sets a count value of a counter to 0.

Step S703: The mediation device M taps a target device B, sends a handover request to the target device B, and then receives a handover mediation response fed back by the target device B, so as to acquire connection configuration information of the target device B.

Step S704: The mediation device M performs matching processing between the connection configuration information of the target device B and the connection configuration information of the main device A, to determine connection configuration information that is of the main device A and matches the connection configuration information of the target device B.

Step S705: The mediation device M sends a handover initiate request to the target device B, where the handover initiate request includes the connection configuration information, which matches the connection configuration information of the target device B, of the main device A; and then receives a handover initiate response fed back by the target device B, where the handover initiate response includes connection configuration information selected by the target device B for the main device A.

Step S706: The target device B initiates a communication connection between the target device B and the main device A based on the connection configuration information selected by the target device B for the main device A.

Step S707: The mediation device M saves the connection configuration information of the main device A, and releases the connection configuration information of the target device B, for example, deletes the connection configuration information of the target device B or marks the connection configuration information of the target device B as unusable.

Step S803: The mediation device M adds 1 to the count value of the counter.

Step S804: The mediation device M determines whether the count value of the counter is less than N; and if yes, returns to step S703; or if not, end this procedure.

As can be known by comparing FIG. 10 with FIG. 9 with reference to the foregoing descriptions, a main difference between this embodiment and Embodiment 8 lies in: steps S801 and S802 are added before step S703, and step 708 is replaced with steps 803 and 804, to determine, based on the set quantity N of the target devices, whether an entire communication connection establishment process is completed, and no establishment completion command needs to be used.

Therefore, most of the detailed explanations and special descriptions about Embodiment 8 are also applicable to this embodiment, and details are not described herein. In addition, similar to Embodiment 2 to Embodiment 8, the communication connection establishment method according to this embodiment can also obviously improve ease of operation.

For example, assuming that the mediation device M needs to assist the main device A to separately establish communication connections to N target devices B, in the entire communication connection establishment process in this embodiment, the mediation device M may need to perform N+1 taps, including: first one tap, to complete collection of the connection configuration information of the main device A; and N later taps, to complete collection of connection configuration information of the N target devices B and implement handover initiation of the main device A by each target device B. That is, a quantity of taps needed in this embodiment is the same as those in Embodiment 4, Embodiment 6, and Embodiment 8. In Embodiment 4 and Embodiment 6, an existing handover initiate message needs to be extended to achieve a technical effect of reducing a quantity of taps, while in Embodiment 8 and this embodiment, a technical effect of reducing a quantity of taps and simplifying an operation procedure can be achieved without extending an existing handover initiate message.

Besides, in this embodiment, the mediation device M saves the connection configuration information of the main device A and releases the connection configuration information of the target devices B, which can effectively avoid a misconnection between the target devices B. Therefore, similar to Embodiment 2 to Embodiment 7, the communication connection establishment method according to this embodiment can also achieve a beneficial effect of effectively avoiding a misconnection and obviously improving ease of operation.

In a possible implementation manner, similar to Embodiment 8, after tapping the N target devices, that is, in a case in which a determining result in step S804 is no, the mediation device M may further prompt a user that all the target devices B have established communication connections to the main device, to remind the user that the entire communication connection establishment process is completed.

It should be noted that, similar to Embodiment 8, although FIG. 10 shows that step S701 is performed before step S702, the present disclosure is not limited thereto. In fact, step S701 may be performed after step S702, as long as a tap sequence between the main device and the target devices can be determined before step S703.

Besides, although FIG. 10 shows that step S801 is performed before step S802, the present disclosure is not limited thereto. In fact, step S801 may be performed after step S802, or may be performed simultaneously with step S802, or may be performed before step S702, as long as the quantity of the target devices can be determined before step S703.

Moreover, although FIG. 10 shows that step S803 is performed after step S707, the present disclosure is not limited thereto. In fact, step S803 may be performed before any one of steps S703, S704, S705, S706, and S707, as long as updating of the count value of the counter can be completed after step S802 and before step S804.

Embodiment 10

Figure 11:
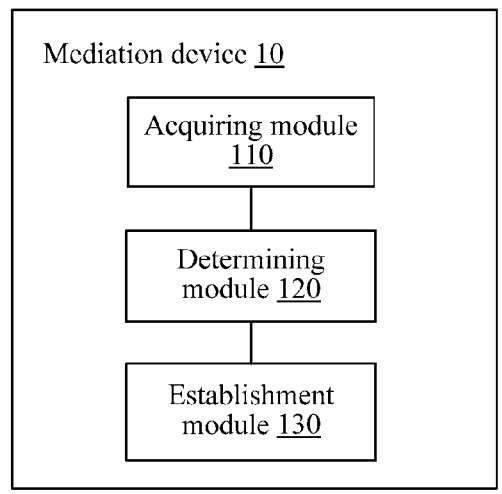
FIG. 11 is a schematic structural diagram of a mediation device according to Embodiment 10 of the present disclosure.

FIG. 11 shows a mediation device according to Embodiment 10 of the present disclosure. As shown in FIG. 11, the mediation device 10 includes: an acquiring module 110, a determining module 120, and an establishment module 130.

The acquiring module 110 is configured to perform a first communication connection to at least three candidate devices, to acquire connection configuration information of the candidate devices, and save the acquired connection configuration information.

The determining module 120, connected to the acquiring module 110, is configured to: before or after or when the first communication connection is performed with the at least three candidate devices, determine that one of the candidate devices is a main device and the other candidate devices are target devices.

The establishment module 130, connected to the determining module 120, is configured to match connection configuration information of the main device with connection configuration information of each of the target devices, so that the main device establishes a second communication connection to each of the target devices.

In a possible implementation manner, the determining module 120 is configured to: determine that the first candidate device that performs the first communication connection to the mediation device is the main device; and the acquiring module 110 is configured to: first perform the first communication connection to the main device, then perform the first communication connection to each of the target devices, to separately acquire the connection configuration information of the main device and the target devices, and save the acquired connection configuration information; further, the establishment module 130 is configured to: each time after the first communication connection is performed with one of the target devices and before the first communication connection is performed with next one of the target devices, match the connection configuration information of the main device with connection configuration information of a target device that currently performs the first communication connection, to obtain matching connection configuration information; and send a handover initiate request to the target device that currently performs the first communication connection, where the handover initiate request includes the matching connection configuration information, so that each target device that currently performs the first communication connection initiates the second communication connection to the main device.

In another possible implementation manner, the determining module 120 is configured to: determine that the last candidate device that performs the first communication connection to the mediation device is the main device; further, the acquiring module 110 is configured for the mediation device to: first perform the first communication connection to the target devices separately, finally perform the first communication connection to the main device, to separately acquire the connection configuration information of the target devices and the main device, and save the acquired connection configuration information.

Besides, the determining module 120 may be further configured to: determine, according to a device selection command, that one of the candidate devices is the main device; or determine that the first device that performs the first communication connection to the mediation device after the first communication connection is performed with the at least three candidate devices is the main device.

Further, the establishment module 130 may be configured to: match the connection configuration information of the main device with the connection configuration information of each of the target devices, to obtain matching connection configuration information; send one handover initiate request to the main device, where the handover initiate request includes all the matching connection configuration information; and receive one handover initiate response sent by the main device, where the handover initiate response includes connection configuration information selected by the main device for each of the target devices, so that the main device initiates the second communication connection to each of the target devices.

Besides, the establishment module 130 may also be configured to: sequentially match the connection configuration information of the main device with the connection configuration information of each of the target devices, to obtain matching connection configuration information, and send at least two handover initiate requests to the main device, where each of the handover initiate requests includes at least one piece of the matching connection configuration information; and receive at least two handover initiate responses sent by the main device, where each of the handover initiate responses includes connection configuration information selected by the main device for at least one of the target devices, so that the main device initiates the second communication connection to each of the target devices.

The first communication connection includes Near Field Communication NFC, and the second communication connection includes a Bluetooth connection and/or a Wireless Fidelity Wi-Fi connection.

Embodiment 11

Figure 12:
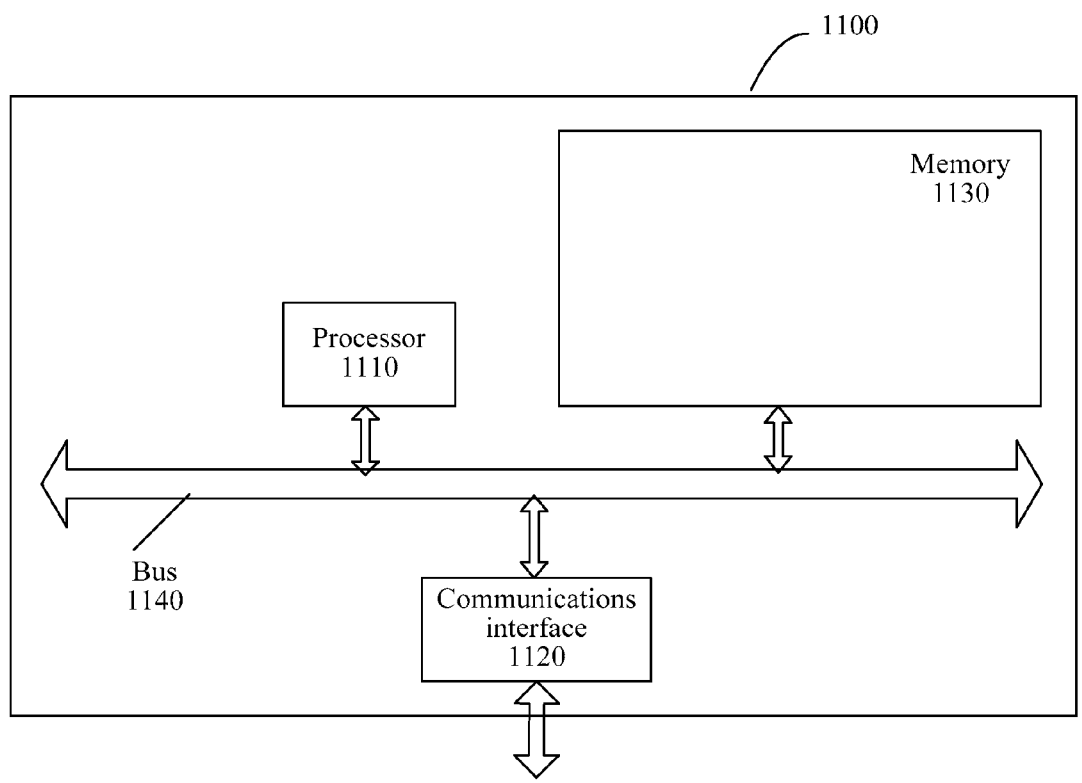
FIG. 12 is a schematic structural diagram of a mediation device according to Embodiment 11 of the present disclosure.

FIG. 12 is a structural block diagram of a mediation device according to another embodiment of the present disclosure. The mediation device 1100 may be a wearable portable computer or terminal having a computing capability. Specific implementation of a computing node is not limited in this specific embodiment of the present disclosure.

The mediation device 1100 includes a processor 1110, a communications interface 1120, a memory 1130, and a bus 1140. The processor 1110, the communications interface 1120, and the memory 1130 communicate with each other by using the bus 1140.

The communications interface 1120 is configured to communicate with a network device, where the network device includes, for example, a virtual machine management center or a shared memory.

The processor 1110 is configured to execute a program. The processor 1110 may be a central processing unit CPU, or may be an application-specific integrated circuit ASIC (Application Specific Integrated Circuit), or may be configured as one or more integrated circuits that implement the embodiments of the present disclosure.

The memory 1130 is configured to store a file. The memory 1130 may include a high speed RAM memory, or may include a non-volatile memory, for example, at least one disk memory. The memory 1130 may also be a memory array. The memory 1130 may also be divided into blocks, and the blocks may form a virtual volume according to a particular rule.

The communications interface 1120 is configured to perform a first communication connection to at least three candidate devices, to acquire connection configuration information of the candidate devices; the memory 1130 is configured to save the connection configuration information acquired by using the communications interface; and the processor 1110, connected to the communications interface 1120 and the memory 1130, is configured to: before or after or when the communications interface 1120 performs the first communication connection to the at least three candidate devices, determine that one of the candidate devices is a main device and the other candidate devices are target devices, and match connection configuration information of the main device with connection configuration information of each of the target devices, so that the main device establishes a second communication connection to each of the target devices.

In a possible implementation manner, the processor 1110 is configured to: determine that the first candidate device that performs the first communication connection to the mediation device is the main device; and each time after the communications interface 1120 performs the first communication connection to one of the target devices and before the communications interface 1120 performs the first communication connection to next one of the target devices, match, by the processor 1110, the connection configuration information of the main device with connection configuration information of a target device that currently performs the first communication connection, to obtain matching connection configuration information, and send, via the communications interface 1120, a handover initiate request to the target device that currently performs the first communication connection, where the handover initiate request includes the matching connection configuration information, so that the target device that currently performs the first communication connection initiates the second communication connection to the main device.

In a possible implementation manner, the processor 1110 is configured to: determine that the last candidate device that performs the first communication connection to the mediation device is the main device.

In a possible implementation manner, the processor 1110 is configured to: determine, according to a device selection command, that one of the candidate devices is the main device; or determine that the first device that performs the first communication connection to the mediation device after the communications interface 1120 performs the first communication connection to the at least three candidate devices is the main device.

In a possible implementation manner, the processor 1110 is configured to: match the connection configuration information of the main device with the connection configuration information of each of the target devices, to obtain matching connection configuration information; send one handover initiate request to the main device via the communications interface 1120, where the handover initiate request includes all the matching connection configuration information; and receive, via the communications interface 1120, one handover initiate response sent by the main device, where the handover initiate response includes connection configuration information selected by the main device for each of the target devices, so that the main device initiates the second communication connection to each of the target devices.

In a possible implementation manner, the processor 1110 is configured to: sequentially match the connection configuration information of the main device with the connection configuration information of each of the target devices, to obtain matching connection configuration information; send at least two handover initiate requests to the main device via the communications interface 1120, where each of the handover initiate requests includes at least one piece of the matching connection configuration information; and receive, via the communications interface 1120, at least two handover initiate responses sent by the main device, where each of the handover initiate responses includes connection configuration information selected by the main device for at least one of the target devices, so that the main device initiates the second communication connection to each of the target devices.

The first communication connection includes Near Field Communication NFC, and the second communication connection includes a Bluetooth connection and/or a Wireless Fidelity Wi-Fi connection.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present disclosure.

If the functions are implemented by computer software and are sold or used as independent products, it may be deemed, to some extent, that all or part (such as the part that contributes to the prior art) of the technical solutions of the present disclosure is embodied by a computer software product. The computer software product is generally stored in a computer readable non-volatile storage medium and includes several instructions for instructing a computer device (which may be a personal computer, a server, or a network device, and the like) to perform all or a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for communication connection establishment, comprising:
   performing, by a mediation device, a first communication connection to at least three candidate devices, to acquire connection configuration information of the candidate devices, and saving the acquired connection configuration information;
   before or after or when the mediation device performs the first communication connection to the at least three candidate devices, determining, by the mediation device, that one of the candidate devices is a main device and the other candidate devices are target devices; and
   matching, by the mediation device, connection configuration information of the main device with connection configuration information of each of the target devices, so that the main device establishes a second communication connection to each of the target devices,
   wherein the determining, by the mediation device, that one of the candidate devices is the main device comprises determining, by the mediation device, that the device that performs the first communication connection to the mediation device after the mediation device performs the first communication connection to the other candidate devices is the main device.

2. The method according to claim 1, wherein the determining, by the mediation device, that one of the candidate devices is the main device comprises:
   determining, by the mediation device according to a device selection command, that one of the candidate devices is the main device.

3. The method according to claim 1, wherein the first communication connection comprises Near Field Communication (NFC), and the second communication connection comprises a Bluetooth connection and/or a Wireless Fidelity (Wi-Fi) connection.

4. A communication connection establishment method, comprising:
   performing, by a mediation device, a first communication connection to at least three candidate devices, to acquire connection configuration information of the candidate devices, and saving the acquired connection configuration information;
   before or after or when the mediation device performs the first communication connection to the at least three candidate devices, determining, by the mediation device, that one of the candidate devices is a main device and the other candidate devices are target devices; and
   matching, by the mediation device, connection configuration information of the main device with connection configuration information of each of the target devices, so that the main device establishes a second communication connection to each of the target devices,
   wherein the determining, by the mediation device, that one of the candidate devices is the main device comprises: determining, by the mediation device, that the candidate device that performs the first communication connection to the mediation device after the other candidate devices perform the first communication connection is the main device; and
   wherein the performing, by the mediation device, the first communication connection to the at least three candidate devices, to acquire the connection configuration information of the candidate devices, and the saving the acquired connection configuration information comprises: first performing, by the mediation device, the first communication connection to the target devices separately, then performing the first communication connection to the main device after performing the first communication connection to the target devices, to separately acquire the connection configuration information of the target devices and the main device, and saving the acquired connection configuration information.

5. The method according to claim 4, wherein the matching, by the mediation device, the connection configuration information of the main device with connection configuration information of each of the target devices, so that the main device establishes the second communication connection to each of the target devices comprises:

matching, by the mediation device, the connection configuration information of the main device with the connection configuration information of each of the target devices, to obtain matching connection configuration information;

sending, by the mediation device, one handover initiate request to the main device, wherein the handover initiate request comprises all the matching connection configuration information; and receiving, by the mediation device, one handover initiate response sent by the main device, wherein the handover initiate response comprises connection configuration information selected by the main device for each of the target devices, so that the main device initiates the second communication connection to each of the target devices.

6. The method according to claim 4, wherein the matching, by the mediation device, the connection configuration information of the main device with connection configuration information of each of the target devices, so that the main device establishes the second communication connection to each of the target devices comprises:

sequentially matching, by the mediation device, the connection configuration information of the main device with the connection configuration information of each of the target devices, to obtain matching connection configuration information, and sending at least two handover initiate requests to the main device, wherein each of the handover initiate requests comprises at least one piece of the matching connection configuration information; and receiving, by the mediation device, at least two handover initiate responses sent by the main device, wherein each of the handover initiate responses comprises connection configuration information selected by the main device for at least one of the target devices, so that the main device initiates the second communication connection to each of the target devices.

7. A mediation device, comprising:
a communications interface, configured to perform a first communication connection to at least three candidate devices, to acquire connection configuration information of the candidate devices;
a memory, configured to save the connection configuration information acquired by using the communications interface; and
a processor, connected to the communications interface and the memory, configured to:
before or after or when the communications interface performs the first communication connection to the at least three candidate devices, determine that one of the candidate devices is a main device and the other candidate devices are target devices, comprising determining that the device that performs the first communication connection to the mediation device after the communications interface performs the first communication connection to the other candidate devices is the main device, and match connection configuration information of the main device with connection configuration information of each of the target devices, so that the main device establishes a second communication connection to each of the target devices.

8. The mediation device according to claim 7, wherein the processor is configured to:
determine, according to a device selection command, that one of the candidate devices is the main device.

9. The mediation device according to claim 7, wherein the first communication connection comprises Near Field Communication (NFC), and the second communication connection comprises a Bluetooth connection and/or a Wireless Fidelity (Wi-Fi) connection.

10. A mediation device, comprising:
a communications interface, configured to perform a first communication connection to at least three candidate devices, to acquire connection configuration information of the candidate devices;
a memory, configured to save the connection configuration information acquired by using the communications interface; and
a processor, connected to the communications interface and the memory, configured to:
before or after or when the communications interface performs the first communication connection to the at least three candidate devices, determine that one of the candidate devices is a main device and the other candidate devices are target devices, comprising determining that the candidate device that performs the first communication connection to the mediation device before the other candidate devices perform the first communication connection is the main device, and
match connection configuration information of the main device with connection configuration information of each of the target devices, so that the main device establishes a second communication connection to each of the target devices.

11. The mediation device according to claim 10, wherein the processor is configured to:
match the connection configuration information of the main device with the connection configuration information of each of the target devices, to obtain matching connection configuration information;
send one handover initiate request to the main device via the communications interface, wherein the handover initiate request comprises all the matching connection configuration information; and
receive, via the communications interface, one handover initiate response sent by the main device, wherein the handover initiate response comprises connection configuration information selected by the main device for each of the target devices, so that the main device initiates the second communication connection to each of the target devices.

12. The mediation device according to claim 10, wherein the processor is configured to:
sequentially match the connection configuration information of the main device with the connection configuration information of each of the target devices, to obtain matching connection configuration information;
send at least two handover initiate requests to the main device via the communications interface, wherein each of the handover initiate requests comprises at least one piece of the matching connection configuration information; and receive, via the communications interface, at least two handover initiate responses sent by the main device, wherein each of the handover initiate responses comprises connection configuration information selected by the main device for at least one of the target devices, so that the main device initiates the second communication connection to each of the target devices.

\* \* \* \* \*